US011151995B2

(12) United States Patent
Jaygarl et al.

(10) Patent No.: US 11,151,995 B2
(45) Date of Patent: Oct. 19, 2021

(54) ELECTRONIC DEVICE FOR MAPPING AN INVOKE WORD TO A SEQUENCE OF INPUTS FOR GENERATING A PERSONALIZED COMMAND

(71) Applicant: SAMSUNG ELECTRONICS CO., LTD., Suwon-si (KR)

(72) Inventors: Ho Jun Jaygarl, Suwon-si (KR); Jae Gun No, Suwon-si (KR); Min Sung Kim, Suwon-si (KR); Jin Woong Kim, Suwon-si (KR); Jae Young Yang, Suwon-si (KR); Kwang Bin Lee, Suwon-si (KR); Jae Yung Yeo, Suwon-si (KR); Da Som Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 84 days.

(21) Appl. No.: 16/360,347

(22) Filed: Mar. 21, 2019

(65) Prior Publication Data
US 2019/0304455 A1 Oct. 3, 2019

(30) Foreign Application Priority Data

Mar. 27, 2018 (KR) .................. 10-2018-0035387

(51) Int. Cl.
*G10L 15/22* (2006.01)
*G06F 3/16* (2006.01)
(Continued)

(52) U.S. Cl.
CPC ............. *G10L 15/22* (2013.01); *G06F 3/167* (2013.01); *G10L 15/08* (2013.01); *G10L 15/30* (2013.01);
(Continued)

(58) Field of Classification Search
CPC ...................................................... G10L 15/22
See application file for complete search history.

(56) References Cited

U.S. PATENT DOCUMENTS 5,867,163 A * 2/1999 Kurtenbach ............. G06F 8/34
715/840
6,690,392 B1 * 2/2004 Wugoski ............... H03J 1/0025
715/744

(Continued)

FOREIGN PATENT DOCUMENTS

| EP | 3 010 015 | 4/2016 |
| EP | 3 454 335 | 3/2019 |
| KR | 10-2008-0033070 | 4/2008 |

OTHER PUBLICATIONS

Thornton, "Creating Your Own Shortcuts & Macros", [online], published in 2008. (Year: 2008).*

(Continued)

*Primary Examiner* — Jialong He
(74) *Attorney, Agent, or Firm* — Nixon & Vanderhye P.C.

(57) ABSTRACT

A system includes a first electronic device configured to receive a first user input through the touchscreen display and/or the microphone, to receive a sequence of touch and/or voice-based user inputs through the touchscreen display and/or the microphone, to store the sequence of the touch and/or voice-based user inputs in the at least one memory, to receive a second user input including at least one invoke word associated with the sequence through the touchscreen display and/or the microphone, and to store the at least one invoke word in the at least one memory such that the sequence and the at least one invoke word are mapped to each other.

18 Claims, 15 Drawing Sheets

(51) Int. Cl.
*G10L 15/08* (2006.01)
*G10L 15/30* (2013.01)

(52) U.S. Cl.
CPC .. *G10L 2015/088* (2013.01); *G10L 2015/223* (2013.01)

(56) References Cited

U.S. PATENT DOCUMENTS

| | | | |
|---|---|---|---|
| 8,407,057 B2 | 3/2013 | Comerford et al. | |
| 8,484,025 B1 | 7/2013 | Mengibar et al. | |
| 8,903,727 B2 | 12/2014 | Comerford et al. | |
| 9,736,311 B1 | 8/2017 | Cronin et al. | |
| 2008/0091426 A1 | 4/2008 | Rempel et al. | |
| 2008/0294986 A1* | 11/2008 | Seo | G06F 3/04817 715/704 |
| 2009/0292778 A1* | 11/2009 | Makar | G06F 16/00 709/206 |
| 2010/0088598 A1* | 4/2010 | Lee | H04M 1/72583 715/704 |
| 2010/0185445 A1 | 7/2010 | Comerford et al. | |
| 2010/0332979 A1* | 12/2010 | Xu | G08C 19/28 715/704 |
| 2015/0121216 A1* | 4/2015 | Brown | G06N 3/008 715/707 |
| 2016/0104484 A1 | 4/2016 | Chakladar et al. | |
| 2016/0335532 A1 | 11/2016 | Sanghavi et al. | |
| 2017/0192942 A1* | 7/2017 | Craik | G06F 40/137 |
| 2017/0243576 A1 | 8/2017 | Millington et al. | |
| 2017/0324869 A1 | 11/2017 | Cronin et al. | |
| 2017/0365251 A1 | 12/2017 | Park et al. | |
| 2018/0164959 A1* | 6/2018 | Gupta | G06Q 10/109 |
| 2018/0226074 A1 | 8/2018 | Millington et al. | |
| 2019/0075167 A1 | 3/2019 | Je et al. | |
| 2019/0235887 A1* | 8/2019 | Hemaraj | G10L 15/22 |

OTHER PUBLICATIONS

International Search Report dated Jun. 20, 2019 in counterpart International Patent Application No. (PCT/KR2019/002384.
Extended Search Report dated Jul. 31, 2019 in counterpart European Patent Application No. 19165319.5.
European Office Action dated Apr. 19, 2021 for EP Application No. 19165319.5.

* cited by examiner

ELECTRONIC DEVICE FOR MAPPING AN INVOKE WORD TO A SEQUENCE OF INPUTS FOR GENERATING A PERSONALIZED COMMAND

CROSS-REFERENCE TO RELATED APPLICATION

This application is based on and claims priority under 35 U.S.C. § 119 to Korean Patent Application No. 10-2018-0035387, filed on Mar. 27, 2018, in the Korean Intellectual Property Office, the disclosure of which is incorporated by reference herein its entirety.

BACKGROUND

1. Field

The present disclosure relates to a technology for a device processing a user voice input.

2. Description of Related Art

In addition to an input scheme using a keyboard or a mouse, recent electronic devices may support a voice input scheme. For example, the electronic devices such as a smartphone or a tablet PC may recognize a user's utterance in a state where a speech recognition service is executed and may execute an operation corresponding to the utterance.

The speech recognition service may receive the user's utterance as an input, and may recognize the received utterance. The speech recognition service may provide the user with the result corresponding to the utterance, using a specific phrase included in the user's utterance. For example, the speech recognition service may understand the user's intent from the utterance based on a natural language processing technology and may provide the user with the result matched with the understood intent.

When the utterance of a user mapped to the pre-stored rule is received, a speech recognition service may generate a command that matches the user's intent using the rule. The command may allow an electronic device to perform a task that the user intends. A service provider may pre-define rules for processing the task. The service provider may support a voice command service for only some tasks of an electronic device that matches a predefined rule, to a user.

The above information is presented as background information only to assist with an understanding of the present disclosure. No determination has been made, and no assertion is made, as to whether any of the above might be applicable as prior art with regard to the present disclosure.

SUMMARY

Embodiments of the present disclosure address at least the above-mentioned problems and/or disadvantages and to provide at least the advantages described below. Accordingly, an aspect of the present disclosure provides an electronic device and a system that are capable of supporting a voice command service that the user directly defines.

In accordance with an example aspect of the present disclosure, a system may include a first electronic device including a touchscreen display, a communication circuit, a microphone, and a speaker, at least one processor, which is a part of the first electronic device or which is configured to remotely communicate with the first electronic device, and at least one memory disposed in the first electronic device or outside the first electronic device, the at least one memory being operatively connected to the at least one processor. The at least one memory may be configured to store instructions that, when executed, cause the at least one processor to control the first electronic device to receive a first user input through the touchscreen display and/or the microphone, to receive a sequence of touch and/or voice-based user inputs through the touchscreen display and/or the microphone, to store the sequence of the touch and/or voice-based user inputs in the at least one memory, to receive a second user input including at least one invoke word associated with the sequence through the touchscreen display and/or the microphone, and to store the at least one invoke word in the at least one memory such that the sequence and the at least one invoke word are mapped to each other.

In accordance with another example aspect of the present disclosure, a method performed by a system may include receiving a first user input, receiving a sequence of touch and/or voice-based user inputs through a touchscreen display and/or a microphone, storing the sequence of the touch and/or voice-based user inputs in a memory, receiving a second user input including at least one invoke word associated with the sequence through the microphone, and storing the at least one invoke word such that the sequence and the at least one invoke word are mapped to each other.

In accordance with another example aspect of the present disclosure, an electronic device may include a touchscreen display, a microphone, storage, at least one processor electrically connected to the touchscreen display, the microphone, and the storage, and at least one memory electrically connected to the at least one processor, the at least one memory configured to store instructions. The instructions may, when executed by the at least one processor control the electronic device to receive a first user input, to receive a sequence including a plurality of touch and/or voice-based user inputs, to store the sequence in the storage, to receive a user utterance associated with the sequence through the microphone, and to store the user utterance in the storage so as to be mapped to the sequence.

According to various example embodiments of the present disclosure, an intelligent system may provide a voice command service associated with a task that a user defines.

According to various example embodiments of the present disclosure, the intelligent system may provide a user command function for the personalized task not corresponding to the pre-stored rule.

A variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, various example embodiments of the present disclosure will be described with reference to accompanying drawings. However, it should be understood that the disclosure is not limited to a specific embodiment and that various modifications, equivalents, and/or alternatives to the various example embodiments described herein are included in the contents of this disclosure.

Figure 1:
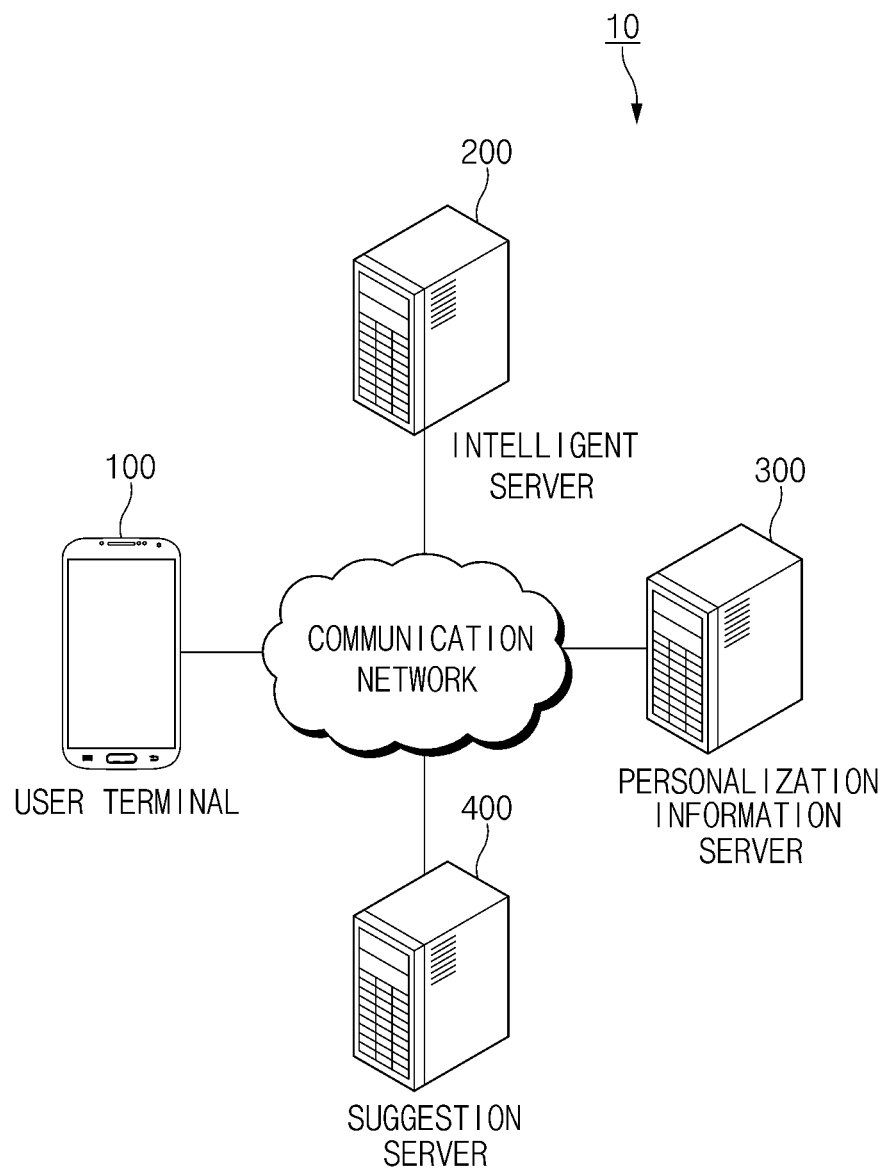
FIG. 1 is a diagram illustrating an example integrated intelligent system, according to various embodiments of the present disclosure.

FIG. 1 is a diagram illustrating an example integrated intelligent system, according to various embodiments of the present disclosure.

Referring to FIG. 1, an integrated intelligent system 10 may include a user terminal 100, an intelligent server 200, a personalization information server 300, and/or a suggestion server 400.

The user terminal 100 may, for example, provide a service necessary for a user through an app (or an application program) (e.g., an alarm app, a message app, a picture (gallery) app, or the like) stored in the user terminal 100. For example, the user terminal 100 may execute and operate another app through an intelligent app (or a speech recognition app) stored in the user terminal 100. The user terminal 100 may receive a user input for executing the other app and executing an action through the intelligent app of the user terminal 100. For example, the user input may be received through, for example, and without limitation, a physical button, a touch pad, a voice input, a remote input, or the like. According to an embodiment, various types of terminal devices (or an electronic device), which are connected with Internet, such as, for example, and without limitation, a mobile phone, a smartphone, personal digital assistant (PDA), a notebook computer, and the like may correspond to the user terminal 100.

According to an embodiment, the user terminal 100 may receive a user utterance as a user input. The user terminal 100 may receive the user utterance and may generate a command for operating an app based on the user utterance. As such, the user terminal 100 may operate the app using the command.

The intelligent server 200 may, for example, receive a user voice input from the user terminal 100 over a communication network and may, for example, change the user voice input to text data. In another embodiment, the intelligent server 200 may generate (or select) a path rule based on the text data. The path rule may, for example, include information about an action (or an operation) for performing the function of an app or information about a parameter necessary to perform the action, but the present disclosure is not limited thereto. In addition, the path rule may include the order of the action of the app. The user terminal 100 may receive the path rule, may select an app depending on the path rule, and may execute the action included in the path rule in the selected app.

For example, the user terminal 100 may execute the action and may display a screen corresponding to a state of the user terminal 100, which executes the action, on a display. For another example, the user terminal 100 may execute the action and may not display the result obtained by executing the action on the display. For example, the user terminal 100 may execute a plurality of actions and may display only the result of a part of the plurality of actions in the display. For example, the user terminal 100 may display only the result, which is obtained by executing the last action, in the display. For another example, the user terminal 100 may receive the user input to display the result obtained by executing the action in the display.

The personalization information server 300 may, for example, include a database in which user information is stored. For example, the personalization information server 300 may receive the user information (e.g., context information, information about execution of an app, or the like) from the user terminal 100 and may store the user information in the database. The intelligent server 200 may be used to receive the user information from the personalization information server 300 over the communication network and to generate a path rule associated with the user input. According to an embodiment, the user terminal 100 may receive the user information from the personalization information server 300 over the communication network and may use the user information as information for managing the database.

The suggestion server 400 may, for example, include a database storing information about, for example, and without limitation, a function in a terminal, introduction of an application, a function to be provided, or the like. For example, the suggestion server 400 may include a database associated with a function that a user utilizes by receiving the user information of the user terminal 100 from the personalization information server 300. The user terminal 100 may receive information about the function to be provided from the suggestion server 400 over the communication network and may provide the information to the user.

Figure 2:
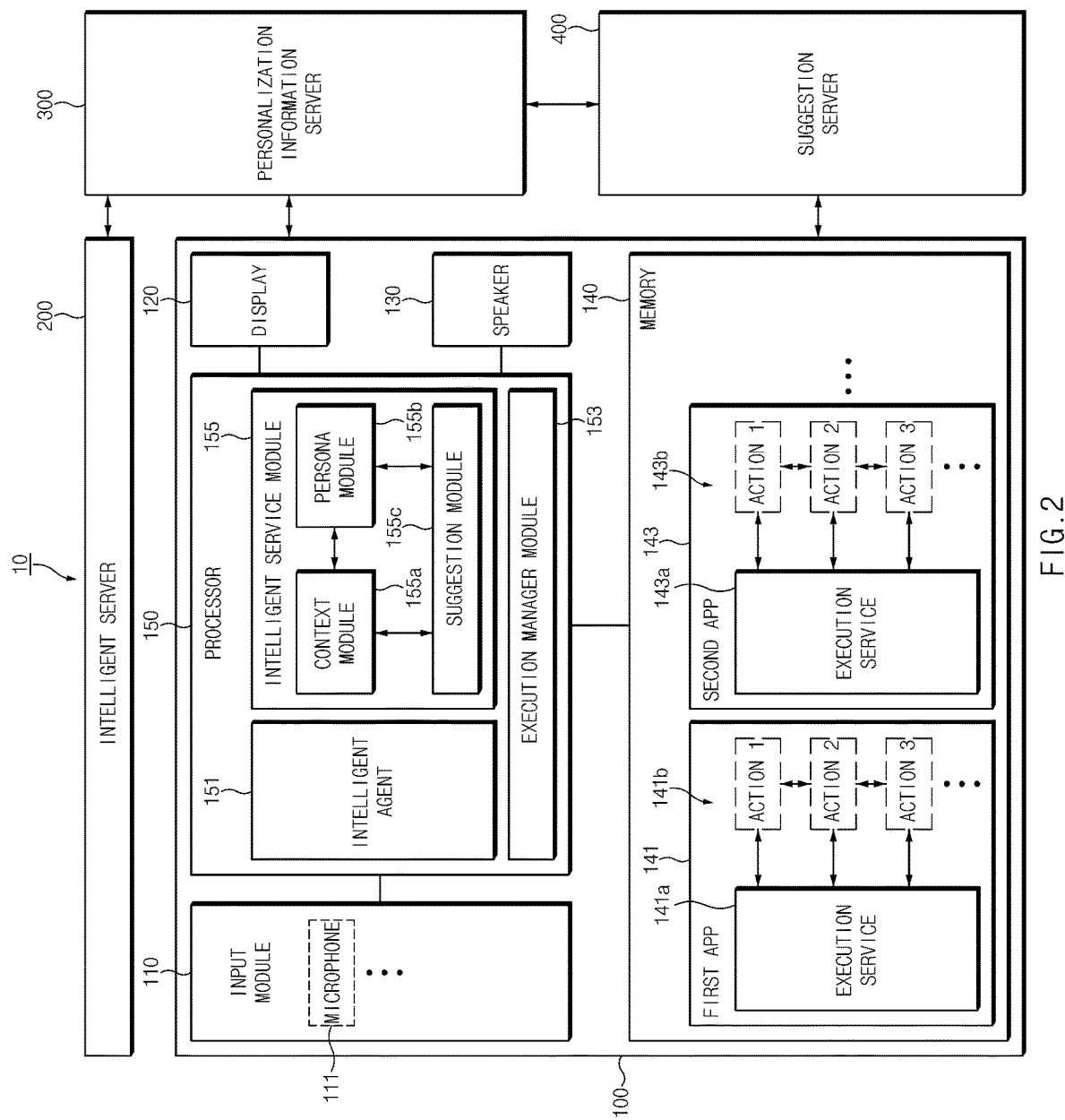
FIG. 2 is a block diagram illustrating an example user terminal of an integrated intelligent system, according to an embodiment of the present disclosure.

FIG. 2 is a block diagram illustrating an example user terminal of an integrated intelligent system, according to an embodiment of the present disclosure.

Referring to FIG. 2, the user terminal 100 may include an input module (e.g., including input circuitry) 110, a display 120, a speaker 130, a memory 140, and/or a processor (e.g., including processing circuitry) 150. The user terminal 100 may further include housing, and components of the user terminal 100 may be seated (disposed) in the housing or may be positioned on the housing.

According to an embodiment, the input module 110 may include various input circuitry and receive a user input from a user. For example, the input module 110 may receive the user input from the connected external device (e.g., a keyboard, a headset, or the like). For another example, the input module 110 may include a touch screen (e.g., a touch screen display) coupled to the display 120. For another example, the input module 110 may include a hardware key (or a physical key) positioned in the user terminal 100 (or the housing of the user terminal 100). However, it will be understood that the disclosure is not limited to the foregoing examples.

According to an embodiment, the input module 110 may include input circuitry, such as, for example, and without limitation, a microphone (e.g., a microphone 111), or the like that is capable of receiving user utterance as a voice signal. For example, the input module 110 may include an utterance input system and may receive the utterance of the user as a voice signal through the utterance input system.

According to an embodiment, the display 120 may, for example, display an image, a video, and/or an execution screen of an application. For example, the display 120 may display a graphic user interface (GUI) of an app.

According to an embodiment, the speaker 130 may output the voice signal. For example, the speaker 130 may output the voice signal generated in the user terminal 100 to the outside.

According to an embodiment, the memory 140 may store a plurality of apps 141 and 143. The plurality of apps 141 and 143 stored in the memory 140 may be selected, launched, and executed depending on (based on) the user input.

According to an embodiment, the memory 140 may include a database capable of storing information necessary to recognize the user input. For example, the memory 140 may include a log database capable of storing log information. For another example, the memory 140 may include a persona database capable of storing user information.

According to an embodiment, the memory 140 may store the plurality of apps 141 and 143, and the plurality of apps 141 and 143 may be loaded to operate. For example, the plurality of apps 141 and 143 stored in the memory 140 may be loaded by the execution manager module (e.g., including processing circuitry and/or program elements) 153 of the processor 150 to operate. The plurality of apps 141 and 143 may include execution services (e.g., including processing circuitry and/or program elements) 141a and 143a performing a function or a plurality of actions (or unit actions) 141b and 143b. The execution services 141a and 143a may be generated by the execution manager module 153 of the processor 150 and then may execute the plurality of actions 141b and 143b.

According to an embodiment, when the actions 141b and 143b of the apps 141 and 143 are executed, an execution state screen based on the execution of the actions 141b and 143b may be displayed in the display 120. For example, the execution state screen may be a screen in a state where the actions 141b and 143b are completed. For another example, the execution state screen may be a screen in a state where the execution of the actions 141b and 143b is in partial landing (e.g., in the case where a parameter necessary for the actions 141b and 143b are not entered). However, the present disclosure is not limited thereto.

According to an embodiment, the execution services 141a and 143a may execute the actions 141b and 143b depending on a path rule. For example, the execution services 141a and 143a may be generated by the execution manager module 153, may receive an execution request according to the path rule from the execution manager module 153, and may execute the actions 141b and 143b of the apps 141 and 153 depending on the execution request. When the execution of the actions 141b and 143b is completed, the execution services 141a and 143a may transmit completion information to the execution manager module 153.

According to an embodiment, in the case where the plurality of the actions 141b and 143b are respectively executed in the apps 141 and 143, the plurality of the actions 141b and 143b may be sequentially executed. When the execution of one action (action 1) is completed, the execution services 141a and 143a may open the next action (action 2) and may transmit completion information to the execution manager module 153. For example, it is understood that opening an arbitrary action is to change a state of the arbitrary action to an executable state and/or to prepare the execution of the action. In other words, when the arbitrary action is not opened, the corresponding action may be not executed. When the completion information is received, the execution manager module 153 may transmit an execution request for the next actions 141b and 143b to an execution service (e.g., action 2). According to an embodiment, in the case where the plurality of apps 141 and 143 are executed, the plurality of apps 141 and 143 may be sequentially executed. For example, when receiving the completion information after the execution of the last action of the first app 141 is executed, the execution manager module 153 may transmit the execution request of the first action of the second app 143 to the execution service 143a.

According to an embodiment, in the case where the plurality of the actions 141b and 143b are executed in the apps 141 and 143, a result screen based on the execution of each of the executed plurality of the actions 141b and 143b may be displayed in the display 120. According to an embodiment, only a part of a plurality of result screens based on the executed plurality of the actions 141b and 143b may be displayed in the display 120.

According to an embodiment, the memory 140 may store an intelligent app (e.g., a speech recognition app) operating in conjunction with the intelligent agent (e.g., including processing circuitry and/or program elements) 151. The app operating in conjunction with the intelligent agent 151 may receive and process the utterance of the user as a voice signal. According to an embodiment, the app operating in conjunction with the intelligent agent 151 may be operated by a specific input (e.g., an input through a hardware key, an input through a touchscreen, a specific voice input, or the like, without limitation) input through the input module 110.

According to an embodiment, the processor 150 may include various processing circuitry and control overall operations of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may include the intelligent agent 151, the execution manager module 153, and/or an intelligent service module (e.g., including processing circuitry and/or program elements) 155. In an embodiment, the processor 150 may drive the intelligent agent 151, the execution manager module 153, and/or the intelligent service module 155 by executing instructions stored in the memory 140. Modules described in various embodiments of the present disclosure may be implemented by hardware or by software or any combination thereof. In various embodiments of the present disclosure, it is understood that the action executed by the intelligent agent 151, the execution manager module 153, or the intelligent service module 155 is an action executed by the processor 150.

According to an embodiment, the intelligent agent 151 may generate an instruction for operating an app based on the voice signal received as the user input. According to an embodiment, the execution manager module 153 may receive the generated instruction from the intelligent agent 151, and may select, launch, and operate the apps 141 and 143 stored in the memory 140. According to an embodiment, the intelligent service module 155 may manage information of the user and may use the information of the user to process the user input.

The intelligent agent 151 may transmit and process the user input received through the input module 110 to the intelligent server 200.

According to an embodiment, before transmitting the user input to the intelligent server 200, the intelligent agent 151 may pre-process the user input. According to an embodiment, to pre-process the user input, the intelligent agent 151 may include, for example, and without limitation, an adaptive echo canceller (AEC) module, a noise suppression (NS) module, an end-point detection (EPD) module, an automatic gain control (AGC) module, or the like. The AEC may remove an echo included in the user input. The NS module may suppress a background noise included in the user input. The EPD module may detect an end-point of a user voice included in the user input to search for a part in which the user voice is present. The AGC module may recognize the user input and may adjust the volume of the user input so as to be suitable to process the recognized user input. According to an embodiment, the intelligent agent 151 may include all the pre-processing components for performance. However, in another embodiment, the intelligent agent 151 may include a part of the pre-processing components to operate at low power.

According to an embodiment, the intelligent agent 151 may include a wakeup recognition module recognizing a call of a user. The wakeup recognition module may recognize a wake up instruction of the user through the speech recognition module. In the case where the wakeup recognition module receives the wake up instruction, the wakeup recognition module may activate the intelligent agent 151 to receive the user input. According to an embodiment, the wakeup recognition module of the intelligent agent 151 may be implemented with a low-power processor (e.g., a processor included in an audio codec, or the like). According to an embodiment, the intelligent agent 151 may be activated depending on the user input entered through a hardware key. In the case where the intelligent agent 151 is activated, an intelligent app (e.g., a speech recognition app) operating in conjunction with the intelligent agent 151 may be executed.

According to an embodiment, the intelligent agent 151 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up instruction in the apps 141 and 143. For example, the speech recognition module for recognizing a user input while assisting the intelligent server 200 may recognize and rapidly process a user instruction processed in the user terminal 100. According to an embodiment, the speech recognition module for executing the user input of the intelligent agent 151 may be implemented in an app processor.

According to an embodiment, the speech recognition module (including the speech recognition module of a wake up module) of the intelligent agent 151 may recognize the user input using an algorithm for recognizing a voice. For example, and without limitation, the algorithm for recognizing the voice may be at least one of a hidden Markov model (HMM) algorithm, an artificial neural network (ANN) algorithm, a dynamic time warping (DTW) algorithm, or the like.

According to an embodiment, the intelligent agent 151 may change the voice input of the user to text data. According to an embodiment, the intelligent agent 151 may transmit the voice of the user to the intelligent server 200 to receive the changed text data. As such, the intelligent agent 151 may display the text data in the display 120.

According to an embodiment, the intelligent agent 151 may receive a path rule from the intelligent server 200. According to an embodiment, the intelligent agent 151 may transmit the path rule to the execution manager module 153.

According to an embodiment, the intelligent agent 151 may transmit the execution result log according to the path rule received from the intelligent server 200 to the intelligent service module 155, and the transmitted execution result log may be accumulated and managed in preference information of the user of a persona manager 155b.

According to an embodiment, the execution manager module 153 may receive the path rule from the intelligent agent 151 to execute the apps 141 and 143 and may allow the apps 141 and 143 to execute the actions 141b and 143b included in the path rule. For example, the execution manager module 153 may transmit instruction information for executing the actions 141b and 143b to the apps 141 and 143 and may receive completion information of the actions 141b and 143b from the apps 141 and 143.

According to an embodiment, the execution manager module 153 may transmit or receive the instruction information for executing the actions 141b and 143b of the apps 141 and 143 between the intelligent agent 151 and the apps 141 and 143. The execution manager module 153 may bind the apps 141 and 143 to be executed depending on the path rule and may transmit the instruction information of the actions 141b and 143b included in the path rule to the apps 141 and 143. For example, the execution manager module 153 may sequentially transmit the actions 141b and 143b included in the path rule to the apps 141 and 143 and may sequentially execute the actions 141b and 143b of the apps 141 and 143 depending on the path rule.

According to an embodiment, the execution manager module 153 may manage execution states of the actions 141b and 143b of the apps 141 and 143. For example, the execution manager module 153 may receive information about the execution states of the actions 141b and 143b from the apps 141 and 143. For example, in the case where the execution states of the actions 141b and 143b are in partial landing (e.g., in the case where a parameter necessary for the actions 141b and 143b are not input), the execution manager module 153 may transmit information about the partial landing to the intelligent agent 151. The intelligent agent 151 may make a request for an input of necessary information (e.g., parameter information) to the user using the received information. For another example, in the case where the execution state of the actions 141b and 143b are in an operating state, the utterance may be received from the user, and the execution manager module 153 may transmit information about the apps 141 and 143 being executed and the execution states of the apps 141 and 143 to the intelligent agent 151. The intelligent agent 151 may receive parameter information of the utterance of the user through the intelligent server 200 and may transmit the received parameter information to the execution manager module 153. The execution manager module 153 may change a parameter of each of the actions 141b and 143b to a new parameter using the received parameter information.

According to an embodiment, the execution manager module 153 may transmit the parameter information included in the path rule to the apps 141 and 143. In the case where the plurality of apps 141 and 143 are sequentially executed depending on the path rule, the execution manager module 153 may transmit the parameter information included in the path rule from one app to another app.

According to an embodiment, the execution manager module 153 may receive a plurality of path rules. The execution manager module 153 may select a plurality of path rules based on the utterance of the user. For example, in the case where the user utterance specifies one app 141 executing one action 141b but does not specify the other app 143 executing the other action 143b, the execution manager module 153 may receive a plurality of different path rules, in which the same app 141 (e.g., gallery app) executing the one action 141b is executed and in which a different app 143 (e.g., message app or Telegram app) executing the other action 143b is executed. For example, the execution manager module 153 may execute the same actions 141b and 143b (e.g., the same successive actions 141b and 143b) of the plurality of path rules. In the case where the execution manager module 153 executes the same action, the execution manager module 143 may display a state screen for selecting the different apps 141 and 143 included in the plurality of path rules in the display 120.

According to an embodiment, the intelligent service module 155 may include a context module (e.g., including processing circuitry and/or program elements) 155a, a persona module (e.g., including processing circuitry and/or program elements) 155b, and/or a suggestion module (e.g., including processing circuitry and/or program elements) 155c.

The context module 155a may include various processing circuitry and/or program elements and collect current states of the apps 141 and 143 from the apps 141 and 143. For example, the context module 155a may receive context information indicating the current states of the apps 141 and 143 to collect the current states of the apps 141 and 143.

The persona module 155b may include various processing circuitry and/or program elements and manage personal information of the user utilizing the user terminal 100. For example, the persona module 155b may collect the usage information and the execution result of the user terminal 100 to manage personal information of the user.

The suggestion module 155c may include various processing circuitry and/or program elements and predict the intent of the user to recommend a command to the user. For example, the suggestion module 155c may recommend a command to the user in consideration of the current state (e.g., a time, a place, a situation, or an app) of the user.

Figure 3:
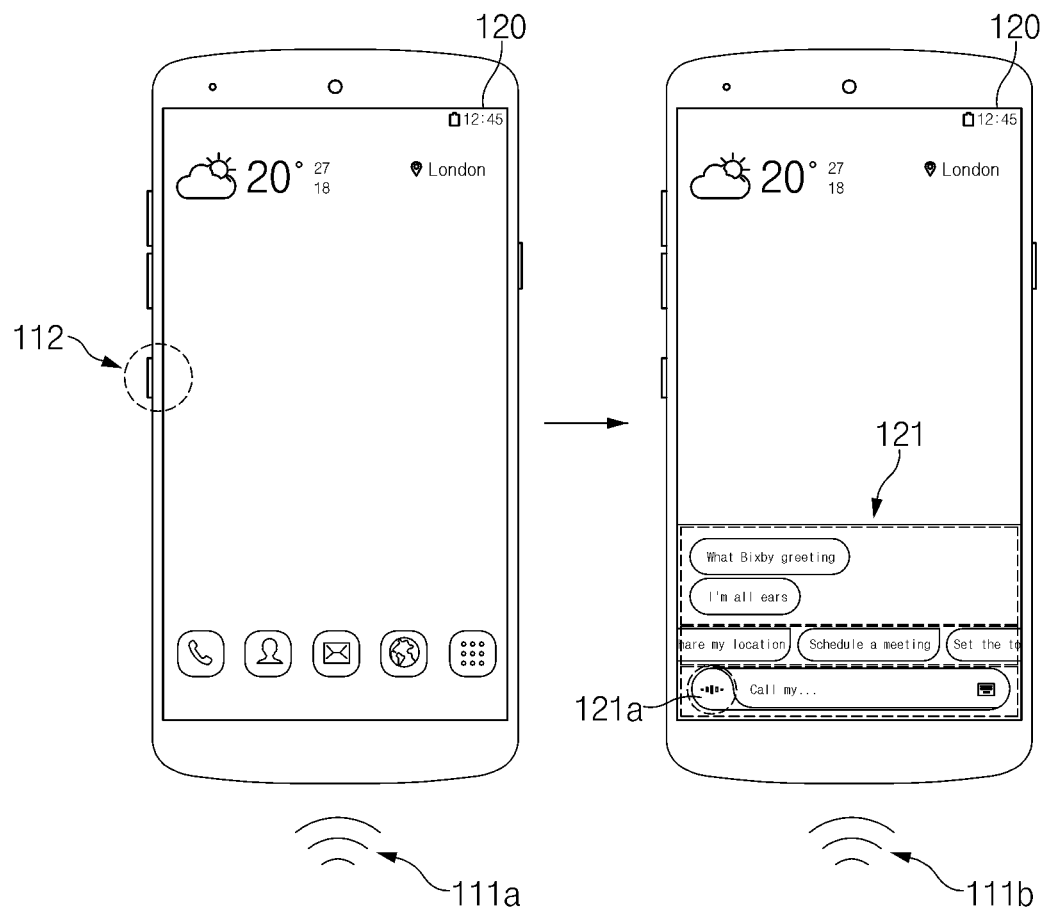
FIG. 3 is a diagram illustrating an example intelligent app of a user terminal being executed, according to an embodiment of the present disclosure.

FIG. 3 is a diagram illustrating an example of an intelligent app of a user terminal being executed, according to an embodiment of the present disclosure.

FIG. 3 illustrates that the user terminal 100 receives a user input to execute an intelligent app (e.g., a speech recognition app) operating in conjunction with the intelligent agent 151.

According to an embodiment, the user terminal 100 may execute the intelligent app for recognizing a voice through, for example, a hardware key 112. For example, in the case where the user terminal 100 receives the user input through the hardware key 112, the user terminal 100 may display a UI 121 of the intelligent app in the display 120. For example, a user may touch a speech recognition button 121a to the UI 121 of the intelligent app for the purpose of entering a voice 111b in a state where the UI 121 of the intelligent app is displayed in the display 120. For another example, while continuously pressing the hardware key 112 to enter the voice 111b, the user may enter the voice 111b.

According to an embodiment, the user terminal 100 may execute the intelligent app for recognizing a voice through the microphone 111. For example, in the case where a specified voice (e.g., wake up!) is entered 111a through the microphone 111, the user terminal 100 may display the UI 121 of the intelligent app in the display 120.

Figure 4:
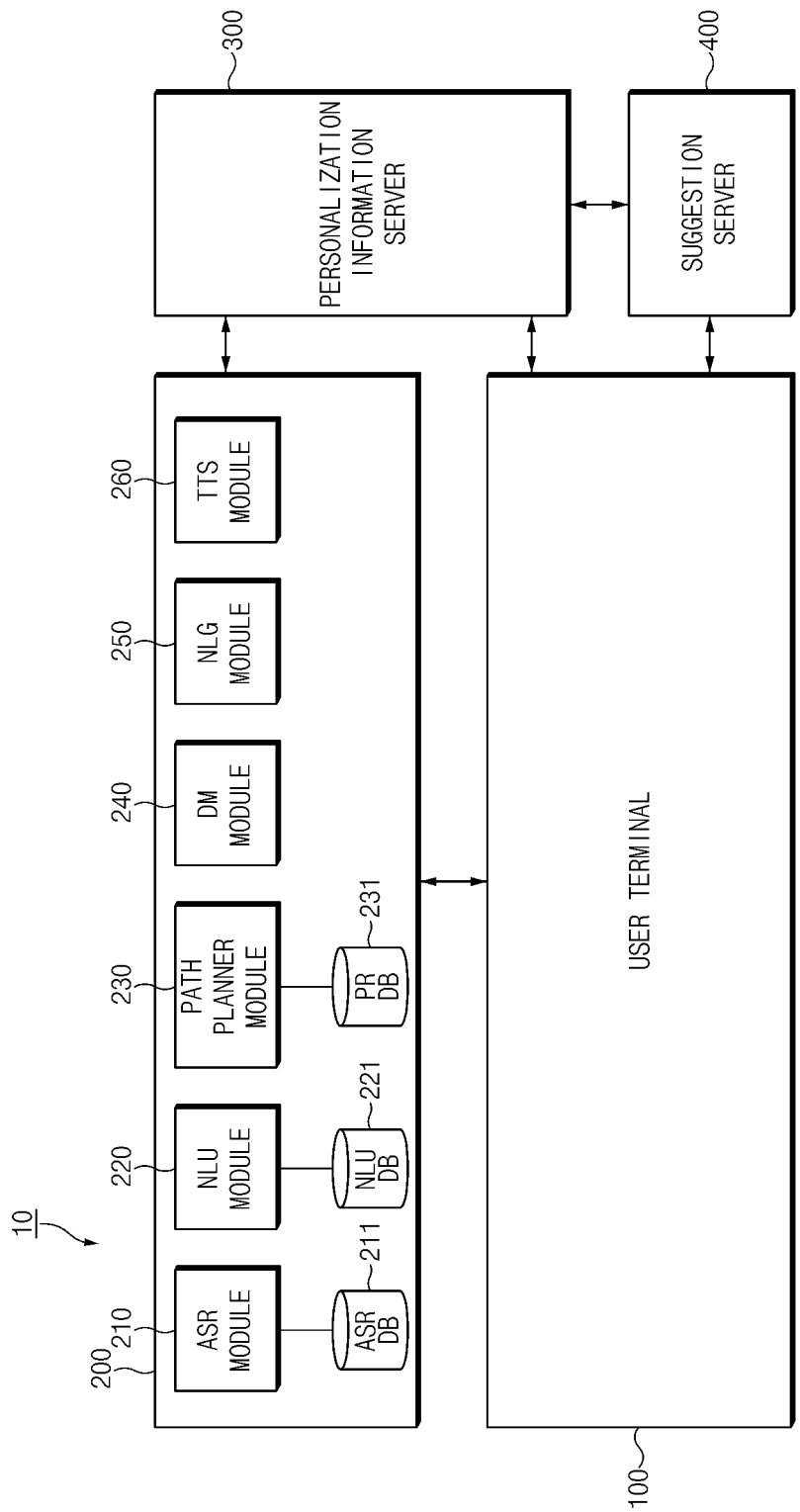
FIG. 4 is a block diagram illustrating an example intelligent server of an integrated intelligent system, according to an embodiment of the present disclosure.

FIG. 4 is a block diagram illustrating an example intelligent server of an integrated intelligent system, according to an embodiment of the present disclosure.

Referring to FIG. 4, the intelligent server 200 may include an automatic speech recognition (ASR) module (e.g., including processing circuitry and/or program elements) 210, a natural language understanding (NLU) module (e.g., including processing circuitry and/or program elements) 220, a path planner module (e.g., including processing circuitry and/or program elements) 230, a dialogue manager (DM) module (e.g., including processing circuitry and/or program elements) 240, a natural language generator (NLG) module (e.g., including processing circuitry and/or program elements) 250, and/or a text to speech (TTS) module (e.g., including processing circuitry and/or program elements) 260.

The NLU module 220 or the path planner module 230 of the intelligent server 200 may include various processing circuitry and/or program elements and generate a path rule.

According to an embodiment, the ASR module 210 may include various processing circuitry and/or program elements and change the user input received from the user terminal 100 to text data.

For example, the ASR module 210 may include a speech recognition module. The speech recognition module may include an acoustic model and a language model. For example, the acoustic model may include information associated with phonation, and the language model may include unit phoneme information and information about a combination of unit phoneme information. The speech recognition module may convert user speech to text data using the information associated with phonation and unit phoneme information. For example, the information about the acoustic model and the language model may be stored in an automatic speech recognition database (ASR DB) 211.

According to an embodiment, the NLU module 220 may include various processing circuitry and/or program elements and understand user intent by performing, for example, and without limitation, syntactic analysis, semantic analysis, or the like. The syntactic analysis may divide the user input into syntactic units (e.g., words, phrases, morphemes, and the like) and determine which syntactic elements the divided units have. The semantic analysis may be performed using semantic matching, rule matching, formula matching, or the like. As such, the NLU module 220 may obtain a domain, intent, or a parameter (or a slot) necessary to express the intent, from the user input.

According to an embodiment, the NLU module 220 may determine the intent of the user and parameter using a matching rule that is divided into a domain, intent, and a parameter (or a slot) necessary to understand the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may understand the meaning of words extracted from a user input using linguistic features (e.g., grammatical elements) such as, for example, and without limitation, morphemes, phrases, and the like, and may match the meaning of the understood words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input using the words, which are based for understanding the intent. According to an embodiment, the NLU module 220 may determine the user intent using the NLU DB 221 storing the linguistic features for understanding the intent of the user input. According to another embodiment, the NLU module 220 may determine the user intent using a personal language model (PLM). For example, the NLU module 220 may determine the user intent using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a path rule based on the intent of the user input and the parameter. For example, the NLU module 220 may select an app to be executed, based on the intent of the user input and may determine an action to be executed, in the selected app. The NLU module 220 may determine the parameter corresponding to the determined action to generate the path rule. According to an embodiment, the path rule generated by the NLU module 220 may include information about the app to be executed, the action to be executed in the app, and a parameter necessary to execute the action.

According to an embodiment, the NLU module 220 may generate one path rule, or a plurality of path rules based on the intent of the user input and the parameter. For example, the NLU module 220 may receive a path rule set corresponding to the user terminal 100 from the path planner module 230 and may map the intent of the user input and the parameter to the received path rule set to determine the path rule.

According to another embodiment, the NLU module 220 may determine the app to be executed, the action to be executed in the app, and a parameter necessary to execute the action based on the intent of the user input and the parameter for the purpose of generating one path rule or a plurality of path rules. For example, the NLU module 220 may arrange the app to be executed and the action to be executed in the app using information of the user terminal 100 depending on the intent of the user input in the form of ontology or a graph model for the purpose of generating the path rule. For example, the generated path rule may be stored in a path rule database (PR DB) 231 through the path planner module 230. The generated path rule may be added to a path rule set of the PR DB 231.

According to an embodiment, the NLU module 220 may select at least one path rule of the generated plurality of path rules. For example, the NLU module 220 may select an optimal path rule of the plurality of path rules. For another example, in the case where only a part of action is specified based on the user utterance, the NLU module 220 may select a plurality of path rules. The NLU module 220 may determine one path rule of the plurality of path rules depending on an additional input of the user.

According to an embodiment, the NLU module 220 may transmit the path rule to the user terminal 100 in response to a request for the user input. For example, the NLU module 220 may transmit one path rule corresponding to the user input to the user terminal 100. For another example, the NLU module 220 may transmit the plurality of path rules corresponding to the user input to the user terminal 100. For example, in the case where only a part of action is specified based on the user utterance, the plurality of path rules may be generated by the NLU module 220.

According to an embodiment, the path planner module 230 may include various processing circuitry and/or program elements and select at least one path rule of the plurality of path rules.

According to an embodiment, the path planner module 230 may transmit a path rule set including the plurality of path rules to the NLU module 220. The plurality of path rules of the path rule set may be stored in the PR DB 231 connected to the path planner module 230 in the table form. For example, the path planner module 230 may transmit a path rule set corresponding to information (e.g., OS information or app information) of the user terminal 100, which is received from the intelligent agent 151, to the NLU module 220. For example, a table stored in the PR DB 231 may be stored for each domain or for each version of the domain.

According to an embodiment, the path planner module 230 may select one path rule or the plurality of path rules from the path rule set to transmit the selected one path rule or the selected plurality of path rules to the NLU module 220. For example, the path planner module 230 may match the user intent and the parameter to the path rule set corresponding to the user terminal 100 to select one path rule or a plurality of path rules and may transmit the selected one path rule or the selected plurality of path rules to the NLU module 220.

According to an embodiment, the path planner module 230 may generate the one path rule or the plurality of path rules using the user intent and the parameter. For example, the path planner module 230 may determine the app to be executed and the action to be executed in the app based on the user intent and the parameter for the purpose of generating the one path rule or the plurality of path rules. According to an embodiment, the path planner module 230 may store the generated path rule in the PR DB 231.

According to an embodiment, the path planner module 230 may store the path rule generated by the NLU module 220 in the PR DB 231. The generated path rule may be added to the path rule set stored in the PR DB 231.

According to an embodiment, the table stored in the PR DB 231 may include a plurality of path rules or a plurality of path rule sets. The plurality of path rules or the plurality of path rule sets may reflect the kind, version, type, or characteristic of a device performing each path rule.

According to an embodiment, the DM module 240 may include various processing circuitry and/or program elements and determine whether the user intent understood by the NLU module 220 is definite. For example, the DM module 240 may determine whether the user intent is clear, based on whether the information of a parameter is sufficient. The DM module 240 may determine whether the parameter understood by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for understanding the user intent.

According to an embodiment, the DM module 240 may include a content provider module. In the case where the content provider module executes an action based on the intent and the parameter understood by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the NLG module 250 may include various processing circuitry and/or program elements and change specified information to a text form. Information changed to the text form may be a form of a natural language utterance. For example, the specified information may be information about an additional input, information for guiding the completion of an action corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may include various processing circuitry and/or program elements and change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130.

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a path rule) corresponding to the determined user intent and parameter. As such, the generated response may be transmitted to the user terminal 100.

Figure 5:
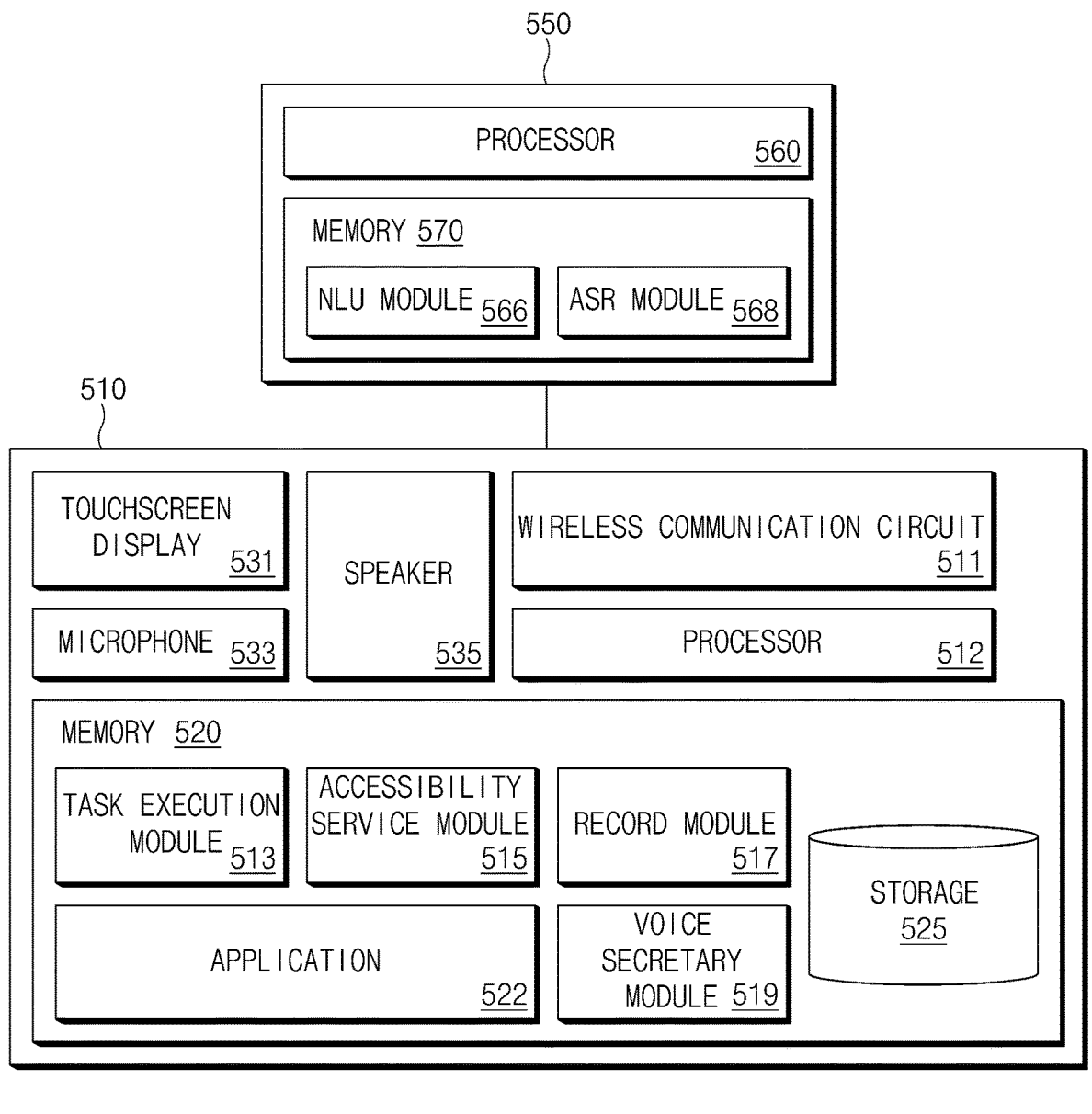
FIG. 5 is a block diagram illustrating an example intelligent system providing a speech recognition service, according to an embodiment.

FIG. 5 is a block diagram illustrating an example intelligent system providing a speech recognition service, according to an embodiment.

Referring to FIG. 5, a system 500 according to an embodiment may include an electronic device 510 including a touchscreen display 531, a communication circuit 511, a microphone 533, and a speaker 535. The system 500 may include at least one processor (e.g., including processing circuitry) 512 and/or 560, which is a part of the electronic device 510 and/or which remotely communicates with the electronic device 510, and at least one memory 520 or 570, which is disposed the electronic device 510 or which is disposed outside the electronic device 510 while being operatively connected to the at least one processor 512 and/or 560.

In an embodiment, the system 500 may provide a speech recognition service. For example, the system 500 may receive an utterance from a user and may understand the user's intent corresponding to the utterance. The system 500 may perform a specific function matched with the user's intent. When the utterance is received, the system 500 may perform the pre-stored command that is mapped to the utterance.

In an embodiment, the system 500 may provide the personalized voice command. For example, the system 500 may store the task defined by the user and the utterance mapped to the task. When receiving the utterance, the system 500 may perform the task defined by the user.

For example, the system 500 may include the electronic device 510 (e.g., the user terminal 200 of FIG. 2) and a server 550 (e.g., the intelligent server 200 of FIG. 4).

In an embodiment, the electronic device 510 may include the wireless communication circuit 511, the memory 520, the touchscreen display 531, the microphone 533, the speaker 535, and the processor (e.g., including processing circuitry) 512.

In an embodiment, the processor 512 may include various processing circuitry and execute instructions stored in the memory 520 to drive a task execution module (e.g., including processing circuitry and/or program elements) 513, an accessibility service module (e.g., including processing circuitry and/or program elements) 515, a record module (e.g., including processing circuitry and/or program elements) 517, and/or a voice secretary module (e.g., including processing circuitry and/or program elements) 519. Modules described in various embodiments of the present disclosure may be implemented by hardware or by software or any combinations thereof. In various embodiments of the present disclosure, it is understood that the operation executed by the task execution module 513, the accessibility service module 515, and/or the record module 517 is the operation executed by the processor 512.

In an embodiment, the voice secretary module 519 may provide a speech recognition service. For example, the voice secretary module 519 may display an interface necessary to provide the speech recognition service, through the display 531 of an electronic device. The voice secretary module 519 may provide the result screen corresponding to the user's command as the speech recognition result, through the display 531.

In an embodiment, the task execution module 513 may perform a function, which is supported by the electronic device 510 and/or a specific application stored in the electronic device 510. For example, when receiving touch or voice-based inputs of the user, the task execution module 513 may perform a task corresponding to the received user inputs. The electronic device 510 may receive a voice input from the user through the microphone 533 and may receive a touch-based user input from the user through the touchscreen display 531. For example, the received user inputs may cause operations of the specific application.

In an embodiment, the accessibility service module 515 may provide functions such as, for example, and without limitation, a text to speech (TTS) for reading the content of the screen displayed in the electronic device 510, a haptic feedback for providing a notification using vibration, and the like. For example, the accessibility service module 515 may be a module provided by Google's Android framework. The accessibility service module 515 may recognize the attribute, content, and the like of the object included in the screen, and may manipulate the recognized object.

For example, the accessibility service module 515 may recognize the object included in the screen by crawling the screen. The accessibility service module 515 may recognize an operation executed when an input is applied to the recognized object. The accessibility service module 515 may also recognize an input method (e.g., tap, long tap, double tap, scroll, drag, flicking, or the like) for executing the corresponding operation. The accessibility service module 515 may inject an operation (e.g., an action) into a task executed by the task execution module 513. For example, when the task execution module 513 receives a state from the intelligent server 550, the accessibility service module 515 may identify the object for performing the state and may inject the operation into the object. For example, the accessibility service module 515 may inject a virtual user input in the input method for performing the state, similarly to the case where a user directly applies an input.

An application (e.g., including processing circuitry and/or program elements) 522 executed by the task execution module 513 may be controlled by the accessibility service module 515. An embodiment is illustrated by way of non-limiting example in FIG. 5 as the electronic device 510 stores the one application 522. However, embodiments may not be limited thereto. For example, the electronic device 510 may store a plurality of applications.

When the action is injected into the application 522 executed by the task execution module 513, the screen displayed on the electronic device 510 may be updated. When the screen is updated, the accessibility service module 515 may determine that an event occurs and may transmit the event to the task execution module 513. The accessibility service module 515 may recognize the attribute, content, and the like of the object included in the updated screen. The accessibility service module 515 may transmit the attribute, the content, and the like of the object to the task execution module 513.

When the event is transmitted, the task execution module 513 may determine whether the execution of the received state is completed. When the execution of the received state is completed, the task execution module 513 may return the result to an execution manager (e.g., the execution manager module 153 of FIG. 2).

In an embodiment, the intelligent server 550 may transmit a state to the electronic device 510. The electronic device 510 may perform the received state.

In an embodiment, the intelligent server 550 may transmit the state corresponding to the task defined by the user to the electronic device 510. The sequence of the user inputs may include user inputs necessary to perform the task defined by the user. For example, the intelligent server 550 may receive the sequence of user inputs and may generate or select a rule associated with the sequence. For example, the rule may be selected in the path rule of FIG. 4 or may be generated in the form the same as or similar to the path rule.

In an embodiment, the rule may include one or more states for performing an action corresponding to the command of the user and information about a parameter necessary to perform the one or more states. In the case where the rule includes a plurality of states, the rule may include information about the sequence of states. The user terminal 510 may receive the rule, may select an application based on the rule, and may perform a state included in the rule by controlling the selected application. For example, the user terminal 510 may perform the state and may display a screen obtained by performing the state, in the display 531.

Figure 6A:
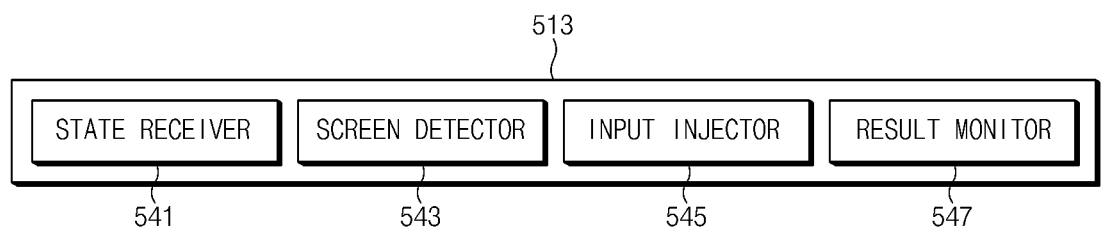
FIG. 6A is a block diagram illustrating an example task execution module stored in an electronic device, according to an embodiment.

FIG. 6A is a block diagram illustrating an example task execution module stored in an electronic device, according to an embodiment.

Referring to FIG. 6A, the task execution module 513 according to an embodiment may include a state receiver (e.g., including processing circuitry and/or program elements) 541, a screen detector (e.g., including processing circuitry and/or program elements) 543, an input injector (e.g., including processing circuitry and/or program elements) 545, and a result monitor (e.g., including processing circuitry and/or program elements) 547. The task execution module 513 may be referred to as the "task execution module 513" illustrated in FIG. 5. The operation described as being performed by the state receiver 541, the screen detector 543, the input injector 545, and the result monitor 547 may be performed by the processor 512 of the electronic device 510.

The state receiver 541 may include various processing circuitry and/or program elements and receive the state included in the rule. The rule may be received from the intelligent server 550 (e.g., the intelligent server 200 of FIG. 4). For example, the state receiver 541 may receive the sequence of states of the electronic device 510 from the intelligent server 550.

The screen detector 543 may include various processing circuitry and/or program elements and detect a screen displayed on the display 531 of the electronic device 510. Before performing the state, the screen detector 543 may detect the screen. The screen detector 543 may receive information about the object included in the screen, from the accessibility service module 515. The screen detector 543 may determine whether the corresponding state is capable of being performed, based on the information received from the accessibility service module 515.

The input injector 545 may include various processing circuitry and/or program elements and determine an action corresponding to the state received by the state receiver 541. For example, the input injector 545 may determine an object for performing the state and an input method associated with the object.

The result monitor 547 may include various processing circuitry and/or program elements and detect a screen displayed on the display 531 of the electronic device 510. The result monitor 547 may detect the screen updated after performing the state. The result monitor 547 may receive information about an object included in the updated screen, from the accessibility service module 515. The result monitor 547 may determine whether the execution of the state is completed, based on the information received from the accessibility service module 515. The result monitor 547 may return the execution result to the task execution module 513 or the intelligent server 550.

The task execution module 513 may include various processing circuitry and/or program elements and execute one of applications installed in the electronic device 510 and may perform the task of the application. The task execution module 513 may be updated together when the application is updated. The updated task execution module 513 may be received from an external device (e.g., the intelligent server 550).

Figure 6B:
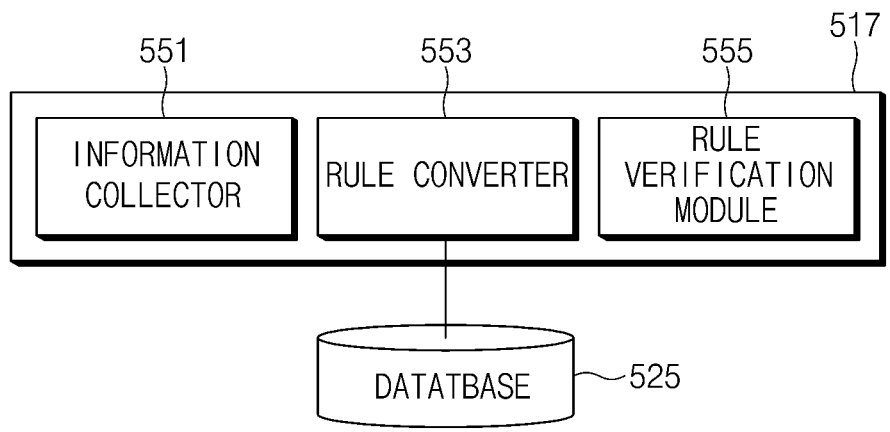
FIG. 6B is a block diagram illustrating an example record module stored in an electronic device, according to an embodiment.

FIG. 6B is a block diagram illustrating an example record module stored in an electronic device, according to an embodiment.

Referring to FIG. 6B, the record module 517 may include an information collector (e.g., including processing circuitry and/or program elements) 551, a rule converter (e.g., including processing circuitry and/or program elements) 553, and a rule verification module (e.g., including processing circuitry and/or program elements) 555.

The information collector 551 may include various processing circuitry and/or program elements and collect input information of a user including a touch or a button input obtained by the electronic device 510 and change information (e.g., screen change of an application, or the like) of the electronic device 510. For example, the input information of the user may be referred to as the coordinate information of the screen on which a touch, a drag, a click, or the like of the user is entered, the execution of a specific function, the pressing of a physical button, the input text, or the like. For example, the change information may include whether the resource id of the application is changed, and various information generated by the task execution module 513.

The rule converter 553 may include various processing circuitry and/or program elements and convert the information, which is collected by the information collector 551, to information having the form capable of being performed by the electronic device 510. For example, the rule converter 553 may convert the collected information into data in the form including a state and a parameter such as a path rule used in the intelligent server 200 (e.g., the intelligent server 200 of FIG. 1). For another example, when there is a deep link based on a connection to a specific page, an image, or a specific operation of an app, the rule converter 553 may convert the collected information in the form of the corresponding deep link and data which is included in the corresponding link. For another example, the rule converter 553 may convert the collected information in the form of an action object using an ontology-based capsule. According to various embodiments, the capsule may include a concept object and an action object. For example, the concept object is an entity model of a real world such as 'restaurant' or a combination of entities such as 'restaurant', 'time', and 'reservation'. In addition, the concept object may be the form of definition for a class of values that a concept object can have. For example, the concept object may have a type such as an integer type, a string type, or the like. The concept object may be the model of an atomic unit of work, may have an external dependency as an input, and may have the predetermined type of output.

The action object may be the form of definition of an action capable of performing any task. For example, the action object may have the form 'functions', 'methods', and 'interface' of JavaScript. The data converted by the rule converter 553 may be performed by the voice secretary module 519 and may be stored in storage (e.g., database) 525.

The rule verification module 555 may include various processing circuitry and/or program elements and determine whether the data generated by the rule converter 553 is operated by the electronic device 510. The rule verification module 555 may determine whether the data is operated, through various methods. For example, the rule verification module 555 may verify the screen state of an application, which is a final target, or may verify the process to execute data.

In various embodiments, the rule verification module 555 may optimize the data generated by the rule converter 553. For example, when the data generated by the user is composed of the user's input of 5 steps, the rule verification module 555 may determine whether there is a route for reducing the data to four steps or three steps. When finding the corresponding route, the rule verification module 555 may replace the data. For another example, when there is a method, which is capable of directly accessing the final target, such that a deep link, the rule verification module 555 may change the data in the corresponding method.

Figure 6C:
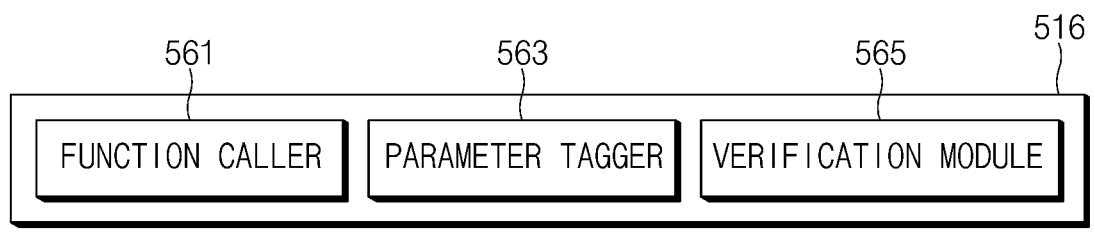
FIG. 6C is a block diagram illustrating an example task execution module stored in an electronic device, according to another embodiment.

FIG. 6C is a block diagram illustrating an example task execution module stored in an electronic device, according to another embodiment.

Referring to FIG. 6C, a block diagram of a task execution module according to another embodiment is illustrated.

In another embodiment, a task execution module 516 may be implemented differently from the task execution module 513 of FIG. 6A. For example, when the task to be executed is a deep link or a Viv capsule, the task execution module 516 may perform a task through performing the function including a parameter. The task execution module 516 may include a function caller (e.g., including processing circuitry and/or program elements) 561, a parameter tagger (e.g., including processing circuitry and/or program elements) 563, and a verification module (e.g., including processing circuitry and/or program elements) 565.

The function caller 561 may include various processing circuitry and/or program elements and be referred to as a "module" performing an action or a function corresponding to the task to be performed. When a rule corresponding to a user utterance is selected and a function corresponding to the selected rule is defined, the function caller 561 may perform the defined function.

The parameter tagger 563 may include various processing circuitry and/or program elements and transmit a parameter necessary such that the function caller 561 performs a function. The parameter tagger 563 may store the parameter necessary for the function corresponding to the user utterance.

The verification module 565 may include various processing circuitry and/or program elements and determine whether the rule performed through the task execution module 513 is performed normally. For example, the verification module 565 may compare the result performed when the performed function is registered first, with the currently performed result. For example, the verification module 565 may compare a screen ID of the result screen of the function. The verification module 565 may verify the execution of a function through the return value, depending on the type of called function (e.g., a deep link or a Viv capsule).

Figure 7:
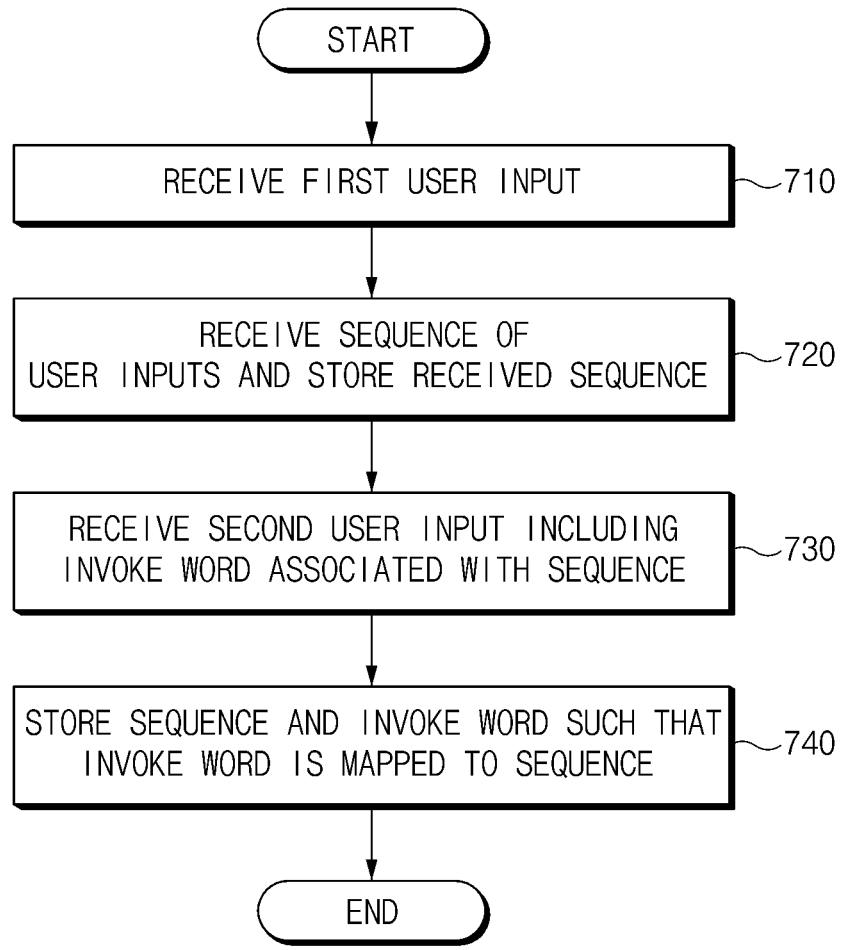
FIG. 7 is a flowchart illustrating an example method of generating a personalized command, according to an embodiment.

FIG. 7 is a flowchart illustrating an example method of generating a personalized command, according to an embodiment.

Referring to FIG. 7, a personalized command generating method performed by a system according to an embodiment may include operation 710, 720, 730 and operation 740. For example, operation 710, 720, 730 and operation 740 may be performed by the system 500 illustrated in FIG. 5. For example, operation 710, 720, 730 and operation 740 may be respectively implemented with instructions capable of being performed (or executed) by the at least one processor 512 or 560 of the system 500. The instructions may be stored in, for example, a computer-readable recording medium or the memory 520 or 570 of the system 500. Hereinafter, in the descriptions about operation 710, 720, 730 and operation 740, a description that is the same as or similar to the description given with reference to FIG. 5 may not be repeated here.

In operation 710, the system 500 may receive a first user input. For example, the system 500 may receive the first user input through the touchscreen display 531 or the microphone 533.

In various embodiments, the system 500 may support an interface for generating the personalized command. For example, the system 500 may execute a first mode for generating the personalized voice command in response to the first user input. For example, the first user input may be referred to as a user input for executing the interface. For example, the user may touch a button (e.g., a recoding button) for executing the interface. The user may enter an utterance (e.g., command generation) for executing the interface. In operation 720, the system 500 may receive the sequence of touch and/or voice-based user inputs through the touchscreen display 531 or the microphone 533, after receiving the first user input. The system 500 may store the sequence in the memory 520 or 570. For example, the storing of the sequence in the memory 520 or 570 may be referred to as "recording an action of the user".

In various embodiments, the user may generate the personalized task. For example, the user may perform a plurality of inputs to be stored. The system 500 may receive the sequence of a plurality of inputs and may store the sequence. The stored sequence may correspond to the personalized task of the user. For example, the user may perform the task to be stored, through a touch operation.

In various embodiments, with regard to a screen output through the touchscreen display 531 of the electronic device 510, the system 500 (e.g., the accessibility service module 515) may recognize at least one object included in the screen and at least one action associated with the at least one object. The system 500 may receive and store the sequence of the at least one or more actions associated with the at least one object.

For example, the system 500 may recognize the at least one object and at least one action performed in conjunction with the at least one object, using Android framework stored in the at least one memory 520.

For example, the object may include information associated with the electronic device 510 such as coordinate information, a resource id, an input window, text information, the resolution of the display 531, whether a status bar is present, OS information installed in the electronic device 510, or the like. For example, the action associated with the object may include select, click, long click, scroll, copy, crop, paste, text input, utterance input, or the like. The system 500 may recognize which action is performed in any object. For example, when a search word is entered into a search window, the system 500 may recognize 'an action in which the search word is entered' into the object of the 'search window'. For example, the system 500 may receive the sequence of screen information, object information, and action information. The system 500 may store the received sequence.

In various embodiments, user inputs may correspond to the predefined state in the intelligent server 200. For example, the system 500 may receive a state selected among predefined states or a state corresponding to a user input, as a sequence.

In various embodiments, the system 500 may determine whether the received sequence is correctly performed by the electronic device 510. For example, the electronic device 510 may perform the received sequence and may provide the user with the performed result. For example, the user may determine whether the task that the user intends is performed, based on the performed result. When the task that the user intends is performed well, the user may enter the confirmation on the entered sequence. When the intended task is not performed well, the user may enter the cancellation for the entered sequence and may re-execute user inputs corresponding to the personalized task.

In operation 730, the system 500 may receive a second user input including at least one invoke word associated with the sequence.

For example, the invoke word may be referred to as the "personalized command" capable of calling the personalized task entered by the user. The user may call the stored personalized task, by uttering the invoke word or by entering the invoke word as a text. The second user input including the invoke word may be received through the touchscreen display 531 or the microphone 533.

In operation 740, the system 500 may store the at least one invoke word in the at least one memory 520 or 570 of the system 500 so as to be mapped to the sequence.

For example, the system 500 may store the sequence corresponding to the personalized task of the user together with the invoke word. When the invoke word is entered, the system 500 may perform an action resulting from the sequence mapped to the invoke word. The system 500 may provide the personalized command.

In various embodiments, after receiving data associated with the sequence, the system 500 may provide a plurality of invoke words based on the sequence. For example, the plurality of invoke words may be referred to as a "recommendation item" for the sequence. For example, the server 550 may transmit the recommendation item including a plurality of invoke words to the electronic device 510 based on the sequence and may receive the invoke word selected among the plurality of invoke words, from the electronic device 510. The system 500 may store the selected invoke word in the at least one memory 520 or 570 so as to be mapped to the received sequence.

Figure 8:
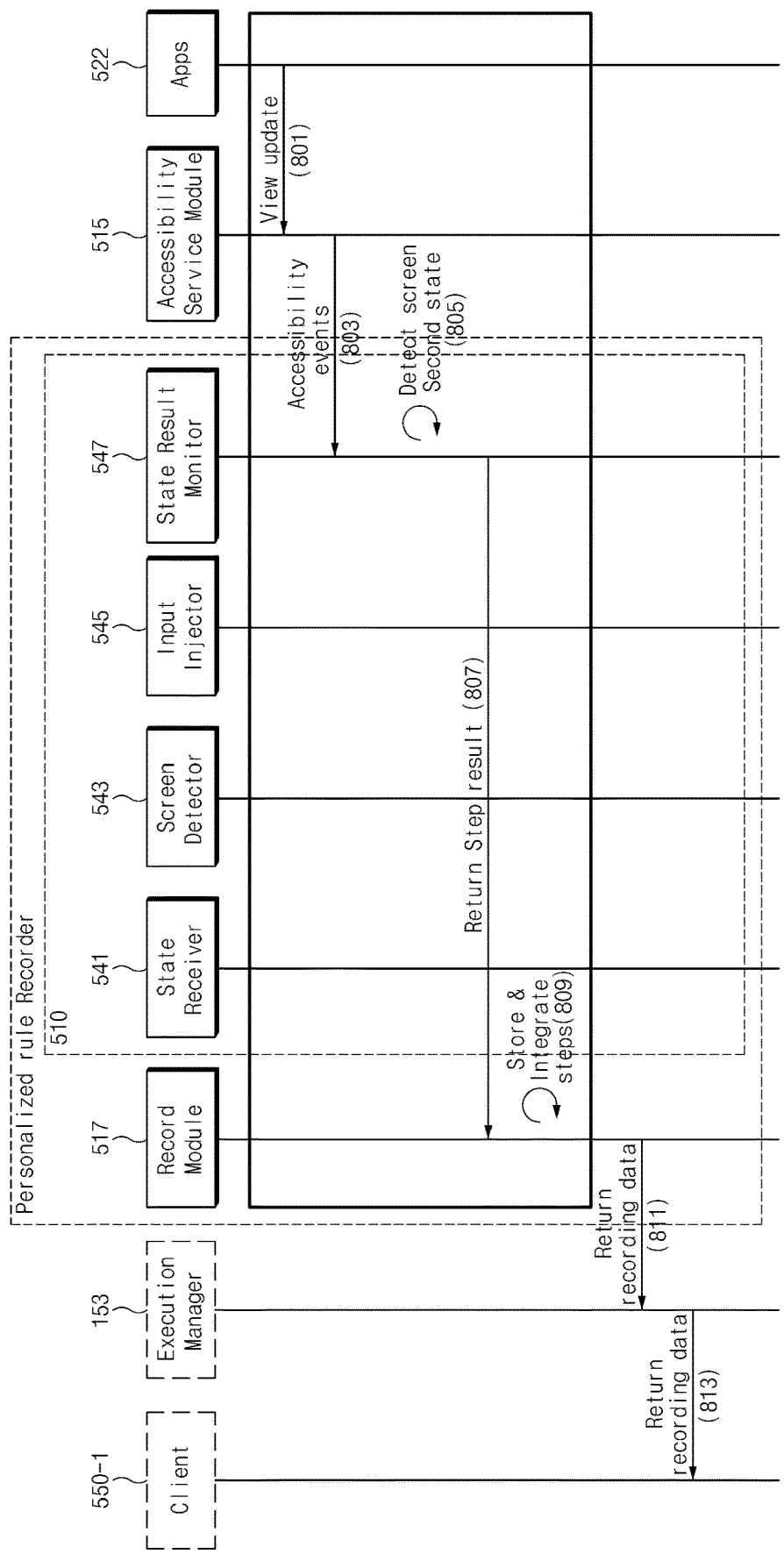
FIG. 8 is a sequence diagram illustrating an example operation of a system generating a personalized command, according to various embodiments.

FIG. 8 is a sequence diagram illustrating an example operation of a system generating a personalized command, according to various embodiments.

In various embodiments, the sequence including a plurality of user inputs may be associated with the at least one application 522 installed in the electronic device 510. Referring to FIG. 8, for example, the process to generate the personalized command associated with the one application 522 is illustrated.

The system 500 may display a screen output depending on the execution of the application 522, through the display 531. The system 500 (e.g., the accessibility service module 515) may recognize at least one object included in the screen and at least one action associated with the at least one object.

The system 500 may receive an action associated with the object included in a first screen. In operation 801, the accessibility service module 515 may sense a second screen updated depending on the action. When sensing the update of a screen, in operation 803, the accessibility service module 515 may generate an event and may send the event to the result monitor 547. In operation 805, the result monitor 547 may capture (detect) the state of the second screen and may, in operation 807, send the state of the second screen to the record module 517. The record module 517 may store the received second screen information. For example, the record module 517 may store first screen information, action information about the object of the first screen, and second screen information updated by the action in operation 809. In various embodiments, operation 801, 803, 805, 807 and operation 809 may be performed repeatedly. As such, the sequence of inputs of a user may be stored by the record module 517.

When the storage of the sequence is completed, in operation 811, the record module 517 may send data associated with the sequence to an execution manager (e.g., the execution manager module 153 of FIG. 2). In operation 813, the execution manager may send the data associated with the sequence to a client 550-1 of the intelligent server 550 that will send the data. The intelligent server 550 may send the data associated with the sequence to the intelligent server 550 through the client 550-1.

In various embodiments, the system 500 may store data associated with the invoke word mapped to the sequence in the storage 525 of the electronic device 510 or may send the data to the intelligent server 550 through the client 550-1. The intelligent server 550 may store the data in the memory 570.

Figure 9:
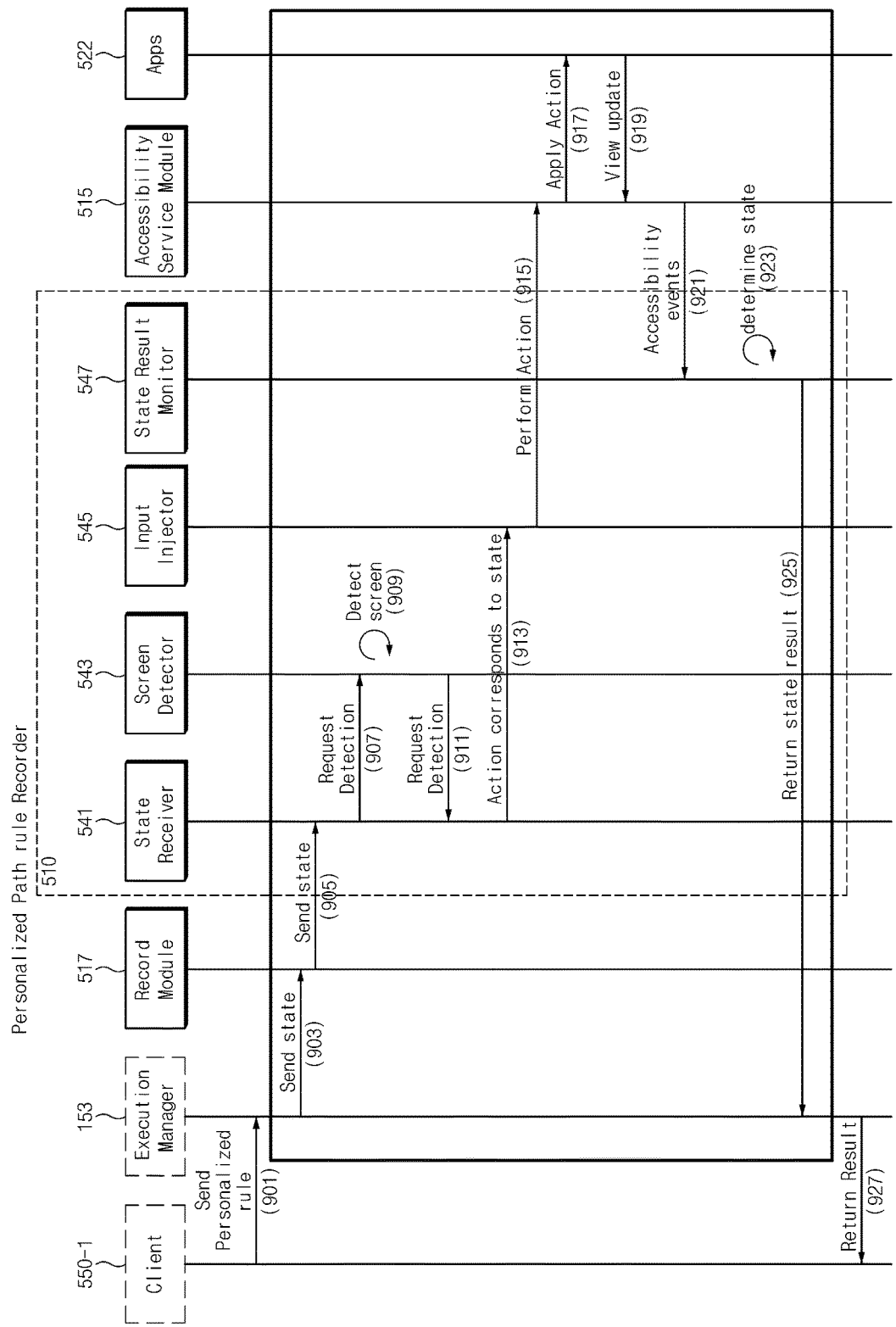
FIG. 9 is a sequence diagram illustrating an example operation of a system performing a personalized command generated according to various embodiments.

FIG. 9 is a sequence diagram illustrating an example operation of a system performing a personalized command generated according to various embodiments.

Referring to FIG. 9, when receiving a user input including an invoke word, the system 500 may perform a personalized command mapped to the invoke word. For example, the system 500 may perform an action resulting from the sequence of the stored user inputs.

In various embodiments, the system 500 may provide a speech recognition service. For example, the system 500 may receive the user's utterance including the invoke word. The system 500 may search for the pre-stored sequence in response to the user utterance. The system 500 may change the sequence to a rule including a state capable of being performed by the electronic device 510 and may send the rule to the system 500.

In an embodiment, in operation 901, the system 500 may receive the rule (e.g., the rule of FIG. 5) corresponding to the user's utterance through the client 550-1 and provide it to the execution manager 153. In operation 903, the execution manager (e.g., the execution manager module 153 of FIG. 2) may send the state included in the rule to the record module 517. For example, when a plurality of states are included in the rule, in operation 903, the execution manager module 153 may sequentially send the plurality of states to the record module 517.

In an embodiment, in operation 905, the record module 517 may send the received state to the task execution module 513. In various embodiments, the system 500 may store a plurality of applications and may include the task execution module 513 corresponding to each of the plurality of applications. For example, the record module 517 may determine which application performs the state, and may send the state to the task execution module 513 corresponding to the application.

In operation 907, the state receiver 541 may request the screen detector 543 to sense a screen for the purpose of executing the received state. In operation 909, the screen detector 543 may detect the screen and may determine whether the state is executable. In operation 911, the screen detector 543 may send the detected result to the state receiver 541. When the state is executable, in operation 913, the state receiver 541 may send an action corresponding to the state to the input injector 545.

In operation 915, the input injector 545 may perform the requested action using the function of the accessibility service module 515. In operation 917, the action performed through the accessibility service module 515 may be applied to the target application 522; as a result, in operation 919, the screen of the target application 522 may be updated. When sensing the update of the screen, in operation 921, the accessibility service module 515 may determine that an event occurs. In operation 923, the result monitor 547 may receive the event and may determine whether the state is performed normally. The result monitor 547 may send whether the state is successful or fails to the execution manager module 153 in operation 925. Operation 903 to operation 925 may be repeated until all the states included in the rule received from the intelligent server 550 are executed. When all the states included in the rule are executed, the execution manager module 153 may send the result to the client 550-1 of the intelligent server 550 in operation 927. The intelligent server 550 may verify that the execution of the corresponding rule is completed normally.

Figure 10:
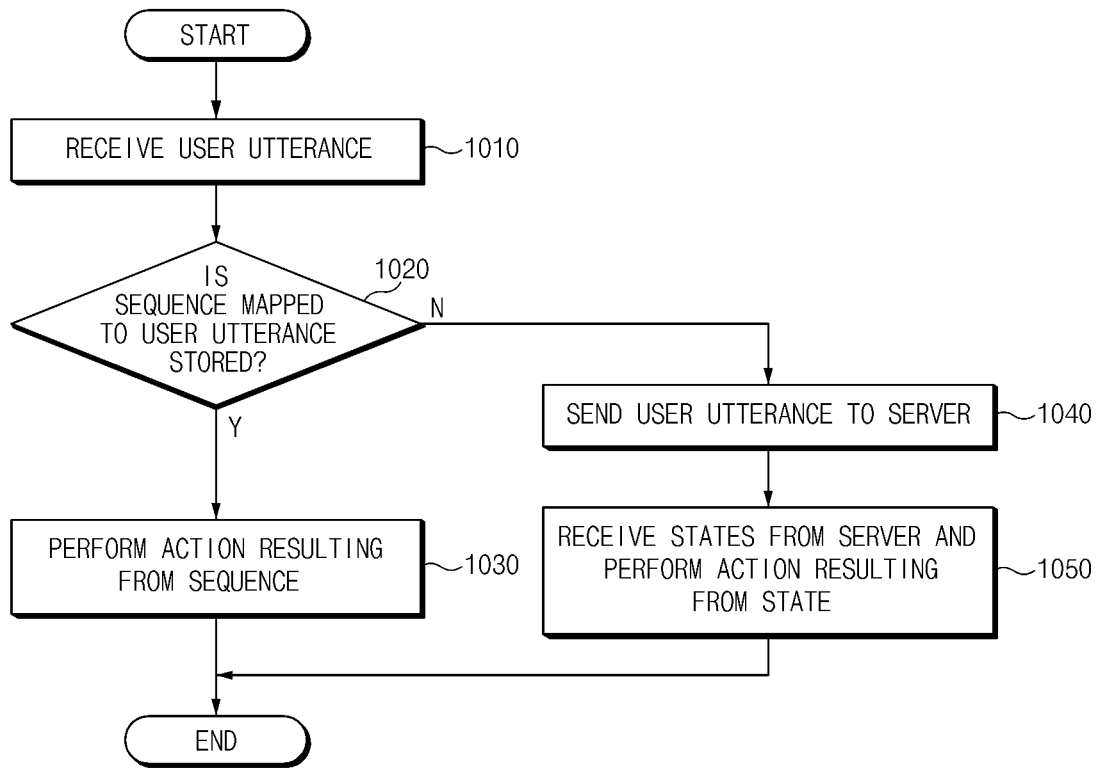
FIG. 10 is a flowchart illustrating an example method of performing a personalized command, according to an embodiment.

FIG. 10 is a flowchart illustrating an example method of performing a personalized command, according to an embodiment.

Referring to FIG. 10, according to an embodiment, a method of performing a personalized command may include operation 1010, 1020, 1030, 1040 and operation 1050. Operation 1010, 1020, 1030, 1040 and operation 1050 may be performed by, for example, the electronic device 510 illustrated in FIG. 5. Operation 1010, 1020, 1030, 1040 and operation 1050 may be respectively implemented with, for example, instructions capable of being performed (or executed) by the processor 512 of the electronic device 510. The instructions may be stored in, for example, a computer-readable recording medium or the memory 520 of the electronic device 510. Hereinafter, in the descriptions about operation 1010, 1020, 1030, 1040 and operation 1050, a description that is the same as or similar to the description given with reference to FIG. 5 may not be repeated here.

In various embodiments, the electronic device 510 may provide a speech recognition service. The electronic device 510 may store the personalized command in the storage 525; when the personalized command is received, the electronic device 510 may perform the personalized task. The electronic device 510 may store the personalized command directly without storing the personalized command in a server (e.g., the server 550) that provides the speech recognition service, thereby quickly providing the personalized task.

In operation 1010, the electronic device 510 may receive a user utterance through the microphone 533. The user utterance may be referred to as a "command" corresponding to the pre-stored personalized task. For example, the user utterance may include an invoke word.

For example, the electronic device 510 may send the utterance of the user to the intelligent server 550. The intelligent server 550 may convert the utterance to a text using an ASR module 568. In various embodiments, the electronic device 510 may further include an ASR module. In this case, the electronic device 510 may directly convert the utterance of the user to the text using the ASR module.

In operation 1020, the electronic device 510 may determine whether the sequence stored after being mapped to the utterance of the user is stored. The storage 525 of the electronic device 510 may store the sequence corresponding to the personalized task. The electronic device 510 may search for the storage 525 using the text converted from the utterance. The electronic device 510 may search for the sequence mapped to the utterance of the user in the storage 525.

When the sequence mapped to the user utterance is stored, in operation 1030, the electronic device 510 may perform an action resulting from the sequence. For example, the task execution module 513 of the electronic device 510 may execute the rule corresponding to the sequence and the state. In various embodiments, the sequence may be executed through a specific application that executes the sequence. When the sequence corresponding to the personalized task is stored, the user may call the personalized task by uttering a command stored after being mapped to the personalized task. In particular, the personalized task may be associated with the specific application.

When the sequence mapped to the user utterance is not stored, in operation 1040, the electronic device 510 may send the user utterance to the intelligent server 550. In this case, the user utterance may be referred to as a "command" stored in advance in the intelligent server 550. When the sequence corresponding to the received user utterance is not stored in the storage 525, the electronic device 510 may determine that the user utterance is not a personalized command but a command provided by the intelligent server 550.

In operation 1050, the electronic device 510 may receive the states corresponding to the pre-stored command from the intelligent server 550 and may perform an action resulting from the states. For example, the task execution module 513 of the electronic device 510 may receive the states from the intelligent server 550 and may execute the states. When the states are associated with the specific application, the task execution module 513 may execute the corresponding application and may execute the states on the application.

In various embodiments, the personalized task may be stored in the memory 570 of the intelligent server 550. For example, both a predetermined task and a personalized task, which are provided by the speech recognition service of the intelligent server 550 may be stored in the intelligent server 550. In this case, the electronic device 510 may send the user utterance to the intelligent server 550 and may receive the sequence mapped to an invoke word included in the user utterance, from the intelligent server 550.

Figure 11:
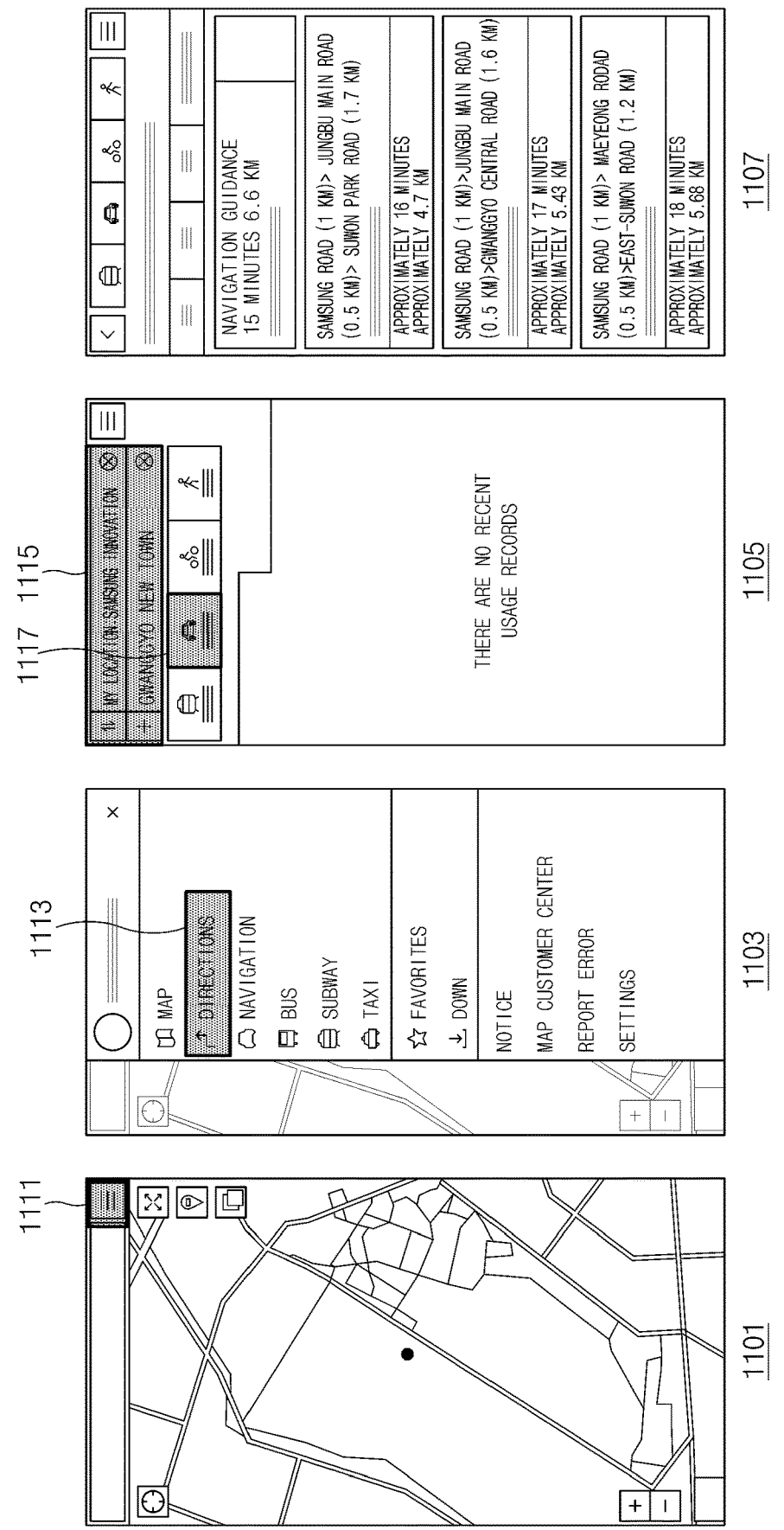
FIG. 11 is a diagram illustrating an example scenario and method for generating a personalized task, according to various embodiments.
Figure 12:
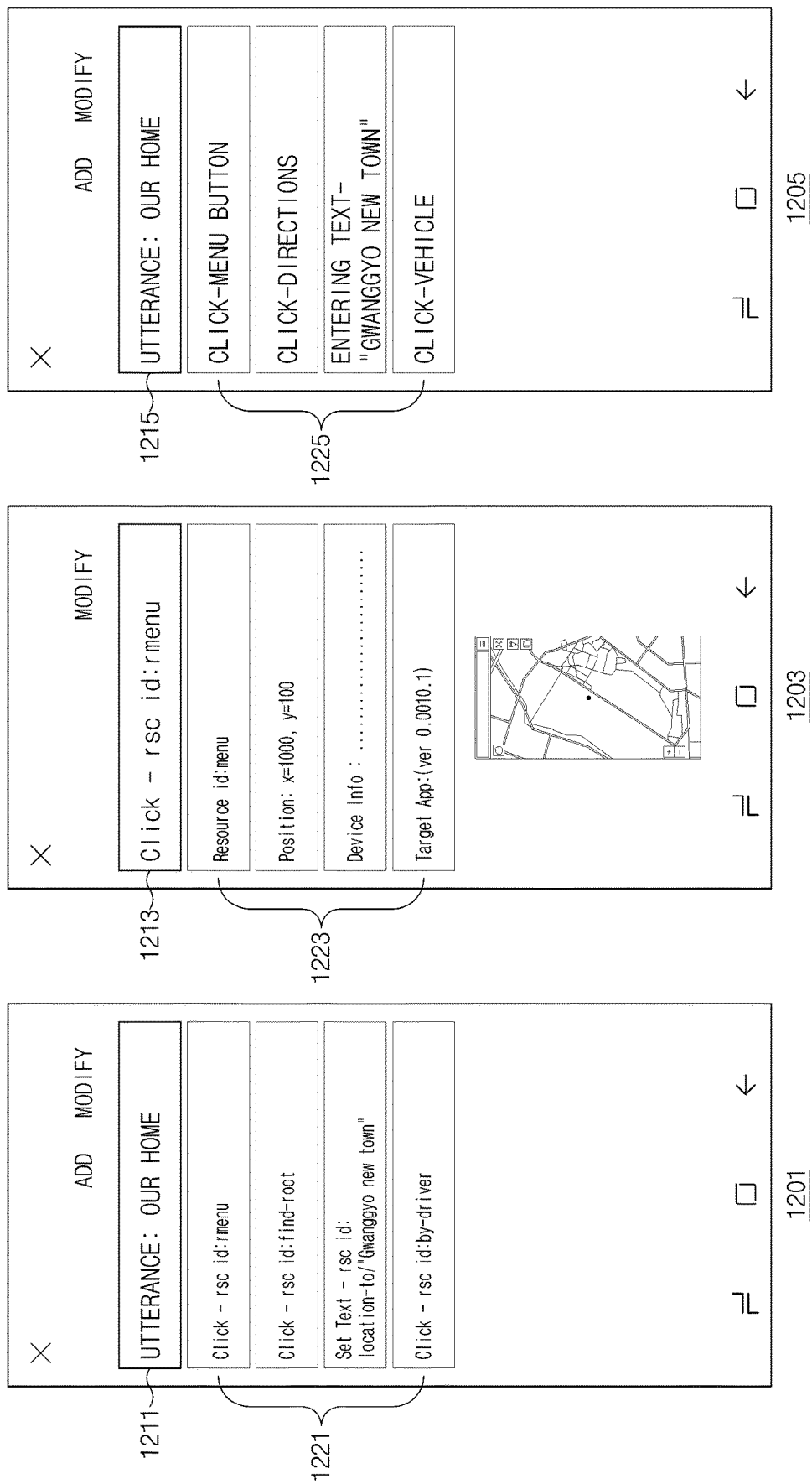
FIG. 12 is diagram illustrating an example interface displayed when a personalized task is generated, according to various embodiments.

FIG. 11 is a diagram illustrating an example method for generating a personalized task in an example scenario, according to various embodiments. FIG. 12 is a diagram illustrating an example interface displayed when a personalized task is generated, according to various embodiments.

Referring to FIG. 11, for example, one example scenario to generate a personalized task for a map application is described. One scenario to generate a route search action performed by a map application as the personalized task is described as an example. For example, a user may generate the route search action from a specific starting point to a specific destination as a personalized task.

The system 500 may execute a mode (hereinafter referred to as a "learning mode") for generating the personalized task. The system 500 may receive the predetermined user input to start the learning mode and may execute the learning mode in response to the reception.

For example, when receiving a touch input to a button (e.g., a recording start button) displayed on the display 531, the system 500 may execute the learning mode in response to the reception. When the predetermined utterance is received through the microphone 533, the system 500 may execute the learning mode in response to the reception. For example, the predetermined utterance may be set in various forms 'quick command generation', 'starting a learning mode', and the like.

When the learning mode is executed, the system 500 may receive various user inputs such as a text input, a touch input, a drag input, and a click input using a keyboard or a mouse. The various user inputs may be referred to as "actions" to be executed by the personalized command. When receiving various user inputs, the system 500 may store actions corresponding to the user inputs using information associated with the screen on which the user inputs are received.

For example, the system 500 may store actions included in the personalized command through the accessibility service module 515. For example, the accessibility service module 515 may identify a type of user input. The accessibility service module 515 may obtain information associated with a screen including a screen ID (e.g., resource id), text information displayed on a screen, coordinate information of an object displayed on a screen, and the like.

In one scenario, the learning mode may be executed, and the system 500 may receive an execution action (action 0) (e.g., a click input to a map application) for a map application. The system 500 may execute the map application. When the map application is executed, screen 1 1101 may be displayed.

Screen 1 1101. screen 2 1103, screen 3 1105 and screen 4 1107 may be referred to as screens displayed depending on the execution of the map application. The system 500 (e.g., the accessibility service module 515) may obtain object information included in screen 1 1101, screen 2 1103, screen 3 1105 and screen 4 1107. For example, the electronic device 510 may recognize a menu button 1111 of screen 1 1101 and may recognize a 'click action' capable of being performed on the menu button 1111.

In screen 1 1101, the system 500 may receive the click action (action 1) for the menu button 1111. Screen 1 1101 may be updated to screen 2 1103 by the click action. In screen 2 1103, the system 500 may receive a click action (action 2) to a directions button 1113. Screen 2 1103 may be updated to screen 3 1105 by the click action. In screen 3 1105, the system 500 may receive an input action (action 3) of a text (Gwanggyo new town') in a text input window 1115 and may receive a click action (action 4) to the vehicle directions button 1117. Screen 3 1105 may be updated to screen 4 1107 by the click action. The system 500 may store the sequence of action 0 to action 4 in the storage 525 or may send the sequence of action 0 to action 4 to the intelligent server 550. The sequence may be referred to as the personalized task.

For example, when the input of the personalized task is completed, the system 500 may store the input sequence in the memory 520. When a user input to make a request for the termination of the learning mode is received, the system 500 may terminate the learning mode in response to the reception of the user input and may store the sequence. For example, when receiving a touch input to a button (e.g., a recording end button) displayed on the display 531, the system 500 may terminate the learning mode in response to the reception. When the predetermined utterance is received through the microphone 533, the system 500 may execute the learning mode in response to the reception. For example, the predetermined utterance may be set in various forms 'quick command completion', 'terminating a learning mode', and the like.

In various embodiments, the system 500 may obtain an utterance corresponding to the sequence and may store the utterance in the storage 525 such that the utterance and the sequence are mapped to each other. The utterance may be referred to as an invoke word that allows the sequence to be performed. Alternatively, the system 500 may send the sequence and data associated with the utterance to the intelligent server 550. The utterance may be referred to as a personalized command.

In various embodiments, the system 500 may display the received actions through the display 531. Referring to screen 1201 of FIG. 12, the system 500 may display received action 0 to action 4 through the display 531. The system 500 may display the received actions and may provide a function to edit actions. Referring to screen 1 1201, actions 1221 may be displayed as function names corresponding to the actions 1221. For example, the actions 1221 displayed on screen 1 1201 may be referred to as an object name and a function name, which are provided by Android framework.

In various embodiments, the system 500 may display the received actions on the screen such that users understand the received actions. Referring to screen 3 1205, actions 1225 may be displayed so as to be easily understood by users.

For example, 'click-resource id: menu' may be displayed as 'click-menu button'; 'Click-resource id: find-root' may be displayed as 'click-directions; 'set text-resource id: location-to/"Gwanggyo new town"' may be displayed as 'entering text—"Gwanggyo new town"'.

In various embodiments, the system 500 may provide a recommendation word for the received actions. For example, the recommendation word may be referred to as the above-described invoke word. The system 500 may provide the recommendation word for the received sequence with reference to the pre-stored sequences and invoke words matched with the pre-stored sequences. For example, referring to screen 1201 and screen 1205, the recommendation word for the received actions is provided as 'our home' 1211. The user may select 'our home' as the invoke word. The 'our home' may be stored after being mapped to action 0 to action 4. Afterward, when the user utters 'our home', action 0 to action 4 corresponding to 'our home' 1215 may be performed by the electronic device 510.

In various embodiments, the system 500 may display object information obtained in conjunction with the received action. Referring to screen 1203, with regard to a 'menu button click' action 1213, a resource id, coordinate information, and a target application 1223 are displayed.

In various embodiments, when the system 500 receives the sequence, the system 500 may perform an action caused by the received sequence and may output the execution result of the action through the display 531. The system 500 may make a request for an input to verify the execution result. The user may determine whether the intended task is entered, with reference to the displayed execution result. When the system 500 receives the verification input, the system 500 may store the sequence in the storage 525 or may send the sequence to the server 550.

In various embodiments, the system 500 may analyze a pattern of the obtained sequence and may store actions, which are repeated identically, in the form of a template. For example, the route search action may be performed on various starting points and various destinations on a map application depending on the one scenario of FIG. 11. Referring to FIG. 11, the route search operation may include the execution (action 0) of a map application, the click (action 1) of the button 1111 placed at right-side upper end of screen 1101, the click (action 2) of the directions button 1113 of screen 1103, and an action (action 4) to enter a starting point and a destination on screen 1105, in common.

In this case, since only the starting point and the destination are different from other actions on screen 1105, the system 500 may store action 0, action 1, and action 2 as templates. The template may be registered in the map application.

In various embodiments, the system 500 may provide the user with the pre-stored template through the electronic device 510. The pre-stored template may be registered in the specific application and may be stored after being mapped to a category for a user command. The system 500 may allow the user to verify the template directly, by playing a screen included in the template, a user input, and a screen changed depending on the user input. Alternatively, the system 500 may play a snap shot for a screen included in the template.

In various embodiments, the user may generate a personalized command corresponding to the template by selecting the provided template. Alternatively, the user may select the provided template and may generate a personalized command obtained by modifying a part of the templates.

In various embodiments, in the case where there are at least one or more templates corresponding to a user input, which is input in the learning mode, when the learning mode is executed, the system 500 may display an action included in the template on the display 531 or may display a list of the at least one or more templates on the display 531.

In various embodiments, the system 500 may optimize the personalized task, which is newly generated using the pre-stored template. For example, a first action and a second action, which are included in the newly generated personalized task, may be included in the pre-stored template. The system 500 may optimize the personalized task by skipping at least one or more actions executed between the first action and the second action based on the pre-stored template. The system 500 may recommend the optimized personalized task and the user may select the recommended task.

In various embodiments, in the system 500, the template registered in the specific application may include version information about the application. The system 500 may compare the version information included in the template with the version information of the currently installed application and may determine whether the template is available. When the version of the stored template is not the same as the version of the currently installed application, the system 500 may download a template of the new version and may allow the version of an application installed in the electronic device 510 to be changed.

Figure 13:
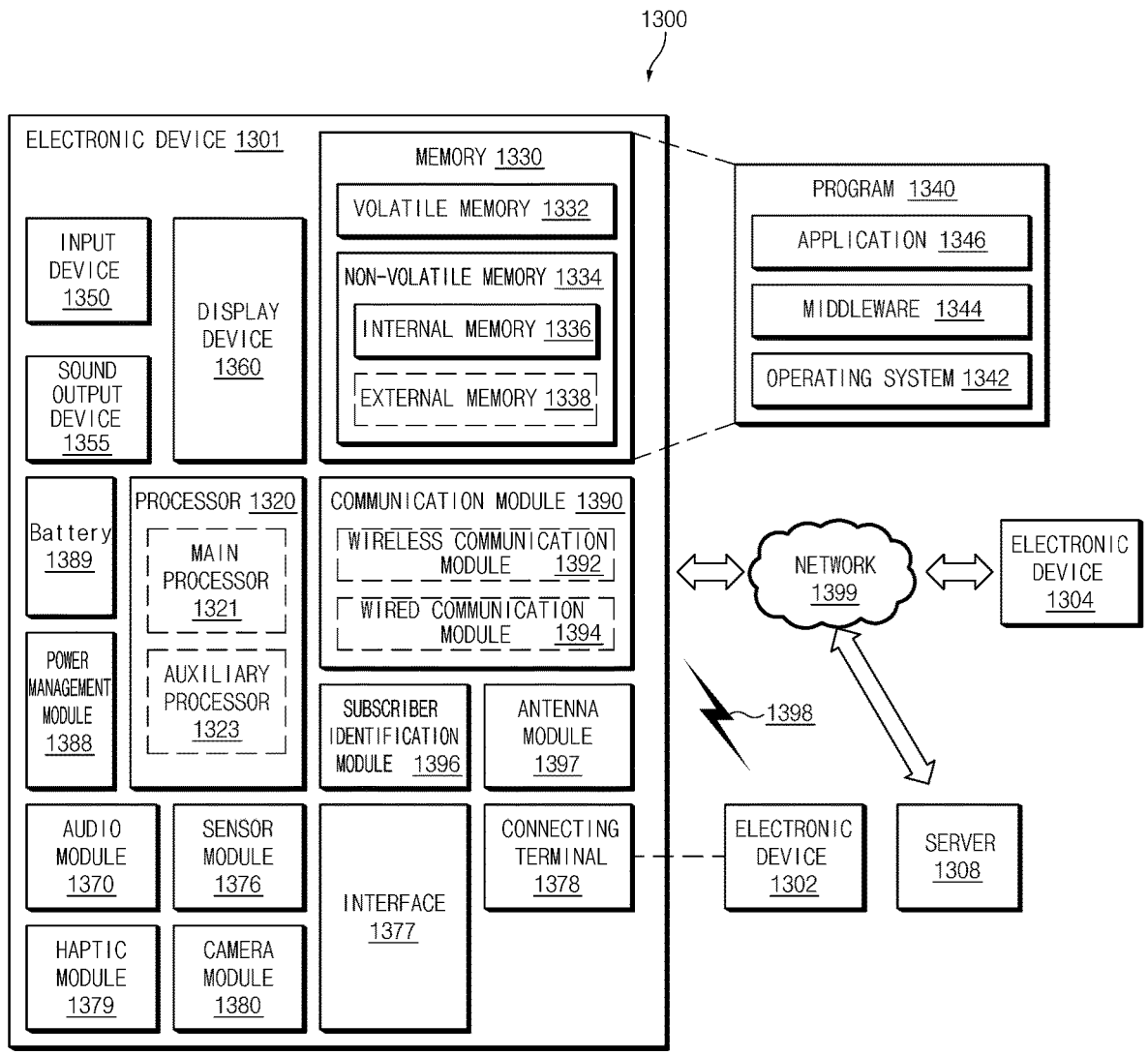
FIG. 13 is a diagram illustrating an example electronic device in a network environment, according to various embodiments of the present disclosure.

FIG. 13 is a block diagram illustrating an electronic device 1301 in a network environment 1300 according to various embodiments. The electronic device according to various embodiments may be one of various types of electronic devices. The electronic devices may include, for example, a portable communication device (e.g., a smart phone), a computer device (e.g., Personal Digital Assistant (PDA), tablet pc, laptop PC (desktop PC, workstation, or server)), a portable multimedia device (e.g., e-book reader or MP3 player), a portable medical device (e.g., heart rate meter, glucose meter, hemadynamometer, or thermometer), a camera, or a wearable device.

Referring to FIG. 13, the electronic device 1301 (e.g., user terminal 200 of FIG. 2, electronic device 510 of FIG. 5) in the network environment 1300 may communicate with an electronic device 1302 via a first network 1398 (e.g., a short-range wireless communication network), or an electronic device 1304 or a server 1308 via a second network 1399 (e.g., a long-range wireless communication network). According to an embodiment, the electronic device 1301 may communicate with the electronic device 1304 via the server 1308.

According to an embodiment, the electronic device 1301 may include a processor 1320 (e.g., processor 512 of FIG. 5), memory 1330, an input device 1350 (e.g., microphone or mouse), a sound output device 1355, a display device 1360, an audio module 1370, a sensor module 1376, an interface 1377, a haptic module 1379, a camera module 1380, a power management module 1388, a battery 1389, a communication module 1390, a subscriber identification module (SIM) 1396, or an antenna module 1397. In some embodiments, at least one (e.g., the display device 1360 or the camera module 1380) of the components may be omitted from the electronic device 1301, or one or more other components may be added in the electronic device 1301.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

The processor 1320 may execute, for example, software (e.g., a program 1340) to control at least one other component (e.g., a hardware or software component) of the electronic device 1301 coupled with the processor 1320 and may perform various data processing or computation. According to one embodiment, as at least part of the data processing or computation, the processor 1320 may load a command or data received from another component (e.g., the sensor module 1376 or the communication module 1390) in volatile memory 1332, process the command or the data stored in the volatile memory 1332, and store resulting data in non-volatile memory 1334. According to an embodiment, the processor 1320 may include a main processor 1321 (e.g., a central processing unit (CPU) or an application processor (AP)), and an auxiliary processor 1323 (e.g., a graphics processing unit (GPU), an image signal processor (ISP), a sensor hub processor, or a communication processor (CP)) that is operable independently from, or in conjunction with, the main processor 1321. Additionally or alternatively, the auxiliary processor 1323 may be adapted to consume less power than the main processor 1321, or to be specific to a specified function. The auxiliary processor 1323 may be implemented as separate from, or as part of the main processor 1321.

The auxiliary processor 1323 may control at least some of functions or states related to at least one component (e.g., the display device 1360, the sensor module 1376, or the communication module 1390) among the components of the electronic device 1301, instead of the main processor 1321 while the main processor 1321 is in an inactive (e.g., sleep) state, or together with the main processor 1321 while the main processor 1321 is in an active state (e.g., executing an application). According to an embodiment, the auxiliary processor 1323 (e.g., an image signal processor or a communication processor) may be implemented as part of another component (e.g., the camera module 1380 or the communication module 1390) functionally related to the auxiliary processor 1323.

The memory 1330 may store various data used by at least one component (e.g., the processor 1320 or the sensor module 1376) of the electronic device 1301. The various data may include, for example, software (e.g., the program 1340) and input data or output data for a command related thereto. The memory 1330 may include the volatile memory 1332 or the non-volatile memory 1334.

The program 1340 may be stored in the memory 1330 as software, and may include, for example, an operating system (OS) 1342, middleware 1344, or an application 1346.

The input device 1350 may receive a command or data to be used by another component (e.g., the processor 1320) of the electronic device 1301, from the outside (e.g., a user) of the electronic device 1301. The input device 1350 may include, for example, a microphone, a mouse, or a keyboard.

The sound output device 1355 may output sound signals to the outside of the electronic device 1301. The sound output device 1355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1360 (e.g., touchscreen display 531 of FIG. 5) may visually provide information to the outside (e.g., a user) of the electronic device 1301. The display device 1360 may include, for example, a display, a hologram device, or a projector and control circuitry to control a corresponding one of the display, hologram device, and projector. According to an embodiment, the display device 1360 may include touch circuitry adapted to detect a touch, or sensor circuitry (e.g., a pressure sensor) adapted to measure the intensity of force incurred by the touch.

The audio module 1370 may convert a sound into an electrical signal and vice versa. According to an embodiment, the audio module 1370 may obtain the sound via the input device 1350, or output the sound via the sound output device 1355 or a headphone of an external electronic device (e.g., an electronic device 1302) directly (e.g., wiredly) or wirelessly coupled with the electronic device 1301.

The sensor module 1376 may detect an operational state (e.g., power or temperature) of the electronic device 1301 or an environmental state (e.g., a state of a user) external to the electronic device 1301, and then generate an electrical signal or data value corresponding to the detected state. According to an embodiment, the sensor module 1376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1377 may support one or more specified protocols to be used for the electronic device 1301 to be coupled with the external electronic device (e.g., the electronic device 1302) directly (e.g., wiredly) or wirelessly. According to an embodiment, the interface 1377 may include, for example, a high definition multimedia interface (HDMI), a universal serial bus (USB) interface, a secure digital (SD) card interface, or an audio interface.

A connecting terminal 1378 may include a connector via which the electronic device 1301 may be physically connected with the external electronic device (e.g., the electronic device 1302). According to an embodiment, the connecting terminal 1378 may include, for example, a HDMI connector, a USB connector, a SD card connector, or an audio connector (e.g., a headphone connector).

The haptic module 1379 may convert an electrical signal into a mechanical stimulus (e.g., a vibration or a movement) or electrical stimulus which may be recognized by a user via his tactile sensation or kinesthetic sensation. According to an embodiment, the haptic module 1379 may include, for example, a motor, a piezoelectric element, or an electric stimulator.

The camera module 1380 may capture a still image or moving images. According to an embodiment, the camera module 1380 may include one or more lenses, image sensors, image signal processors, or flashes.

The power management module 1388 may manage power supplied to the electronic device 1301. According to one embodiment, the power management module 1388 may be implemented as at least part of, for example, a power management integrated circuit (PMIC).

The battery 1389 may supply power to at least one component of the electronic device 1301. According to an embodiment, the battery 1389 may include, for example, a primary cell which is not rechargeable, a secondary cell which is rechargeable, or a fuel cell.

The communication module 1390 may support establishing a direct (e.g., wired) communication channel or a wireless communication channel between the electronic device 1301 and the external electronic device (e.g., the electronic device 1302, the electronic device 1304, or the server 1308) and performing communication via the established communication channel. The communication module 1390 may include one or more communication processors that are operable independently from the processor 1320 (e.g., the application processor (AP)) and supports a direct (e.g., wired) communication or a wireless communication. According to an embodiment, the communication module 1390 may include a wireless communication module 1392 (e.g., a cellular communication module, a short-range wireless communication module, or a global navigation satellite system (GNSS) communication module) or a wired communication module 1394 (e.g., a local area network (LAN) communication module, plain old telephone service (POTS) or a power line communication (PLC) module). A corresponding one of these communication modules may communicate with the external electronic device via the first network 1398 (e.g., a short-range communication network, such as Bluetooth™, wireless-fidelity (Wi-Fi) direct, or infrared data association (IrDA)) or the second network 1399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1392 may identify and authenticate the electronic device 1301 in a communication network, such as the first network 1398 or the second network 1399, using subscriber information (e.g., international mobile subscriber identity (IMSI)) stored in the subscriber identification module 1396.

The antenna module 1397 may transmit or receive a signal or power to or from the outside (e.g., the external electronic device) of the electronic device 1301. According to an embodiment, the antenna module 1397 may include one or more antennas, and, therefrom, at least one antenna appropriate for a communication scheme used in the communication network, such as the first network 1398 or the second network 1399, may be selected, for example, by the communication module 1390 (e.g., the wireless communication module 1392). The signal or the power may then be transmitted or received between the communication module 1390 and the external electronic device via the selected at least one antenna.

According to an embodiment, commands or data may be transmitted or received between the electronic device 1301 and the external electronic device 1304 via the server 1308 coupled with the second network 1399. Each of the electronic devices 1302 and 1304 may be a device of a same type as, or a different type, from the electronic device 1301. According to an embodiment, all or some of operations to be executed at the electronic device 1301 may be executed at one or more of the external electronic devices 1302, 1304, or 1308. For example, if the electronic device 1301 should perform a function or a service automatically, or in response to a request from a user or another device, the electronic device 1301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request and transfer an outcome of the performing to the electronic device 1301. The electronic device 1301 may provide the outcome, with or without further processing of the outcome, as at least part of a reply to the request. To that end, a cloud computing, distributed computing, or client-server computing technology may be used, for example.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1340) including one or more instructions that are stored in a storage medium (e.g., internal memory 1336 or external memory 1338) that is readable by a machine (e.g., the electronic device 1301). For example, a processor (e.g., the processor 1320) of the machine (e.g., the electronic device 1301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been illustrated and described with reference to various embodiments thereof, it will be understood by those skilled in the art that various changes in form and details may be made therein without departing from the spirit and scope of the present disclosure as defined, for example, by the appended claims and their equivalents.

What is claimed is:

1. A system comprising:
   a first electronic device comprising a touchscreen display, a communication circuit, a microphone, and a speaker;
   at least one processor, the at least one processor being a part of the first electronic device and/or configured to remotely communicate with the first electronic device; and
   at least one memory disposed in the first electronic device and/or outside the first electronic device, and being operatively connected to the at least one processor,
   wherein the at least one memory is configured to store instructions that, when executed by the at least one processor, control the first electronic device to:
   receive a first user input executing a learning mode for generating a personalized command through the touchscreen display;
   recognize at least one object included in a first screen output through the touchscreen display;
   a) receive a second user input which is an action of a user associated with at least one of the at least one object, wherein the second user input includes at least one of a selection input to the at least one object or a text input to the at least one object;
   b) update a second screen depending on the action, and recognize a state of the second screen;
   c) store information of the first screen, information of the action on the first screen, and the state of the second screen in the at least one memory;
   repeat a), b) and c) for storing a sequence of inputs;
   after storing the sequence of inputs, receive a third user input including at least one invoke word associated with the sequence of inputs, through the touchscreen display or the microphone; and
   store the at least one invoke word in the at least one memory such that the sequence of inputs and the at least one invoke word are mapped to each other.

2. The system of claim 1, wherein the at least one memory is configured to store instructions that, when executed by the at least one processor, control the first electronic device to:
   receive the at least one invoke word through the touchscreen display or the microphone; and
   perform a sequence of actions resulting from the sequence of inputs, in response to the at least one invoke word.

3. The system of claim 2, wherein the first electronic device includes a first processor of the at least one processor, and
   wherein the system further comprises a server including a second processor of the at least one processor.

4. The system of claim 3, wherein the at least one memory stores instructions that, when executed by the first processor, cause the first processor to control the first electronic device to:
   send the sequence of inputs and data associated with the third user input to the server.

5. The system of claim 4, wherein the at least one memory is configured to store instructions that, when executed by the first processor, control the first electronic device to:
   send data associated with the at least one invoke word to the server;
   receive a sequence of states of the first electronic device from the server to perform the sequence of actions; and
   wherein the sequence of the states cause the first electronic device to perform the sequence of actions.

6. The system of claim 4, wherein the at least one memory stores instructions that, when executed by the second processor, control the server to:
   send a plurality of invoke words to the first electronic device based on the sequence of inputs received from the first electronic device;
   receive data associated with an invoke word selected from among the plurality of invoke words from the first electronic device; and
   store the selected invoke word in the at least one memory so as to be mapped to the sequence of inputs.

7. The system of claim 1, wherein the sequence of inputs is associated with an application installed in the first electronic device.

8. The system of claim 7, wherein the at least one memory stores instructions that, when executed by the at least one processor, control the first electronic device to:
   display the first screen output based on execution of the application through the touchscreen display.

9. The system of claim 1, wherein the at least one memory stores instructions that, when executed by the at least one processor, control the first electronic device to:

display a plurality of invoke words on the touchscreen display based on the sequence of inputs; and store an invoke word, selected from among the displayed plurality of invoke words, in the memory so as to be mapped to the sequence of inputs.

10. The system of claim 1, wherein the at least one memory stores instructions that, when executed by the at least one processor, control the first electronic device to:

receive a first action associated with a first object included in the first screen output through the touchscreen display; and store sequence of information about the first screen, information about the first object, information about the first action, and information about the second screen updated by the first action, in the memory.

11. The system of claim 1, wherein the at least one memory stores instructions that, when executed by the at least one processor, control the first electronic device to:

recognize the at least one object and the action associated with one of the at least one object using an Android framework stored in the memory.

12. A method performed by a system, the method comprising:

receiving a first user input executing a learning mode for generating a personalized command through a touchscreen display of an electronic device;

recognizing at least one object included in a first screen output through the touchscreen display;

a) receiving a second user input which is an action of a user associated with one of the at least one object, wherein the second user input includes at least one of a selection input to the at least one object or a text input to the at least one object;

b) updating a second screen depending on the action, and recognize the state a state of the second screen;

c) storing information of the first screen, the information of the action on the first screen, and the state of the second screen in a memory;

repeating a), b) and c) for storing a sequence of inputs;

after storing the sequence of inputs, receiving a third user input including at least one invoke word associated with the sequence of inputs through a microphone of the electronic device; and storing the at least one invoke word such that the sequence of inputs and the at least one invoke word are mapped to each other.

13. The method of claim 12, further comprising:

performing a sequence of actions resulting from the sequence of inputs in response to the at least one invoke word.

14. An electronic device comprising:
a touchscreen display;
a microphone;
a storage;
at least one processor electrically connected to the touchscreen display, the microphone, and the storage; and at least one memory electrically connected to the at least one processor and configured to store instructions, wherein the instructions, when executed by the at least one processor, control the electronic device to:

receive a first user input executing a learning mode for generating a personalized command through the touchscreen display;

recognize at least one object included in a first screen output through the touchscreen display;

a) receive a second user input which is an action of a user associated with one of the at least one object, wherein the second user input includes at least one of a selection input to the at least one object or a text input to the at least one object;

b) update a second screen depending on the action, and recognize a state of the second screen;

c) store information of the first screen, information of the action on the first screen, and the state of the second screen in the storage;

repeat a), b) and c) for storing a sequence of inputs;

after storing the sequence of inputs, receive a user utterance associated with the sequence of inputs through the microphone; and store the user utterance in the storage so as to be mapped to the sequence of inputs.

15. The electronic device of claim 14, wherein the instructions, when executed by the at least one processor, control the electronic device to:

perform a sequence of actions resulting from the stored sequence of inputs when the stored user utterance is received through the microphone.

16. The electronic device of claim 14, wherein the sequence of inputs includes at least one voice-based user input received through the microphone.

17. The electronic device of claim 16, wherein the instructions, when executed by the at least one processor, cause the electronic device to:

receive a first action associated with a first object included in a first screen output through the touchscreen display; and store a sequence of information about the first screen, information about the first object, information about the first action, and information about the second screen updated by the first action, in the storage.

18. The electronic device of claim 14, wherein the instructions, when executed by the at least one processor, control the electronic device to:

perform an action resulting from the received sequence of inputs;

output the execution result of the action through the touchscreen display; and store the sequence in the storage, when receiving an input to verify the execution result.

* * * * *